(12) United States Patent
Darby

(10) Patent No.: US 11,571,807 B2
(45) Date of Patent: Feb. 7, 2023

(54) DRIVE UNIT FOR ROBOTIC MANIPULATORS

(71) Applicant: Robert Darby, New South Wales (AU)

(72) Inventor: Robert Darby, New South Wales (AU)

(*) Notice: Subject to any disclaimer, the term of this patent is extended or adjusted under 35 U.S.C. 154(b) by 115 days.

(21) Appl. No.: 16/753,573

(22) PCT Filed: Oct. 5, 2017

(86) PCT No.: PCT/AU2017/000210
§ 371 (c)(1),
(2) Date: Apr. 3, 2020

(87) PCT Pub. No.: WO2018/064709
PCT Pub. Date: Apr. 12, 2018

(65) Prior Publication Data
US 2021/0023699 A1 Jan. 28, 2021

(51) Int. Cl.
*B25J 9/12* (2006.01)
*F16C 19/16* (2006.01)
*H02K 11/21* (2016.01)
*B25J 9/10* (2006.01)
*B25J 13/08* (2006.01)
*F16H 1/32* (2006.01)
*H02K 7/04* (2006.01)
(Continued)

(52) U.S. Cl.
CPC ............ *B25J 9/126* (2013.01); *B25J 9/102* (2013.01); *B25J 13/088* (2013.01); *F16C 19/16* (2013.01); *F16H 1/32* (2013.01); *H02K 7/04* (2013.01); *H02K 7/085* (2013.01); *H02K 7/116* (2013.01); *H02K 11/21* (2016.01); *H02K 21/22* (2013.01); *F16H 2001/323* (2013.01)

(58) Field of Classification Search
CPC .......... B25J 9/126; B25J 9/102; B25J 13/088; F16C 19/16; F16H 1/32; F16H 2001/323; F16H 2001/325; F16H 2001/328; H02K 7/04; H02K 7/085; H02K 7/116; H02K 11/21; H02K 21/22
See application file for complete search history.

(56) References Cited

U.S. PATENT DOCUMENTS 1,483,606 A 2/1924 Krohn
2,966,078 A 12/1960 Wright
(Continued)

FOREIGN PATENT DOCUMENTS

CN 2035818 U 4/1989
CN 103742610 A 4/2014
(Continued)

*Primary Examiner* — Charles A Fox
*Assistant Examiner* — Farhana Pervin
(74) *Attorney, Agent, or Firm* — White-Welker & Welker, LLC; Matthew T. Welker, Esq.

(57) ABSTRACT

In one form there is disclosed an internally balanced involute-type speed reducer; the reducer comprising a stator stage, an input stage, an output stage, and a plurality of gear sets in mesh. In a further form there is disclosed an actuator assembly for a robot; said actuator assembly comprising a stator core located within an outer housing and subtended by inner and outer mounting hubs; said hub supporting a drive train and bearings within the actuator assembly. In a further form there is disclosed a transducer system operable in conjunction with the reducer or actuator assembly.

17 Claims, 31 Drawing Sheets

(51) Int. Cl.
*H02K 7/08* (2006.01)
*H02K 7/116* (2006.01)
*H02K 21/22* (2006.01)

(56) References Cited

U.S. PATENT DOCUMENTS

| | | | |
|---|---|---|---|
| 3,169,201 | A | 3/1965 | Srping et al. |
| 4,016,780 | A | 4/1977 | Baranyi |
| 4,574,659 | A | 3/1986 | Arndt |
| 4,604,916 | A | 8/1986 | Distin, Jr. |
| 4,678,952 | A | 7/1987 | Peterson et al. |
| 4,738,591 | A | 4/1988 | Butler |
| 4,796,488 | A | 1/1989 | Hagin |
| 4,838,741 | A | 6/1989 | Dumoulin |
| 4,841,810 | A | 6/1989 | Lew |
| 5,401,220 | A | 3/1995 | Heller |
| 6,084,373 | A | 7/2000 | Goldenberg et al. |
| 7,081,062 | B2 | 7/2006 | Tesar |
| 7,354,371 | B2 | 4/2008 | Hazama et al. |
| 7,396,307 | B2 | 7/2008 | Hazama et al. |
| 7,552,664 | B2 | 6/2009 | Bulatowicz |
| 8,016,893 | B2 | 9/2011 | Weingerg et al. |
| 8,348,798 | B2 | 1/2013 | Lo |
| 8,381,826 | B2 | 2/2013 | Al-Azemi |
| 8,443,684 | B2 | 5/2013 | Thorwart et al. |
| D703,714 | S | 4/2014 | Kim et al. |
| 8,821,331 | B2 | 9/2014 | Winiasz et al. |
| 2002/0135241 | A1 | 9/2002 | Kobayashi et al. |
| 2004/0163896 | A1 | 8/2004 | Wang |
| 2006/0019594 | A1 | 1/2006 | Horner et al. |
| 2008/0070736 | A1 | 3/2008 | Yoshino et al. |
| 2008/0202832 | A1 | 8/2008 | Ai |
| 2009/0005204 | A1 | 1/2009 | Gravio |
| 2009/0062058 | A1 | 3/2009 | Kimes et al. |
| 2010/0016114 | A1 | 1/2010 | Chang |
| 2010/0107814 | A1 | 5/2010 | Tominaga et al. |
| 2011/0245006 | A1 | 10/2011 | Negishi |
| 2012/0286629 | A1 | 11/2012 | Johnson et al. |
| 2013/0307320 | A1* | 11/2013 | Akamatsu ............ B60L 7/14 301/6.5 |
| 2014/0171251 | A1 | 6/2014 | Kullin |
| 2014/0298939 | A1 | 10/2014 | Kim et al. |

FOREIGN PATENT DOCUMENTS

| | | |
|---|---|---|
| CN | 203686041 U | 7/2014 |
| EP | 0146783 A2 | 7/1985 |
| EP | 0612591 A1 | 8/1994 |
| EP | 0655301 B1 | 6/1998 |
| EP | 0863331 A2 | 9/1998 |
| EP | 2532927 A1 | 12/2012 |
| EP | 2532927 B1 | 3/2014 |
| JP | 2000120810 A | 4/2000 |
| WO | 1995012076 A1 | 5/1995 |
| WO | 2012169680 A1 | 12/2012 |
| WO | 2015105914 A1 | 7/2015 |

\* cited by examiner

SECTION C-C
SCALE 5:4

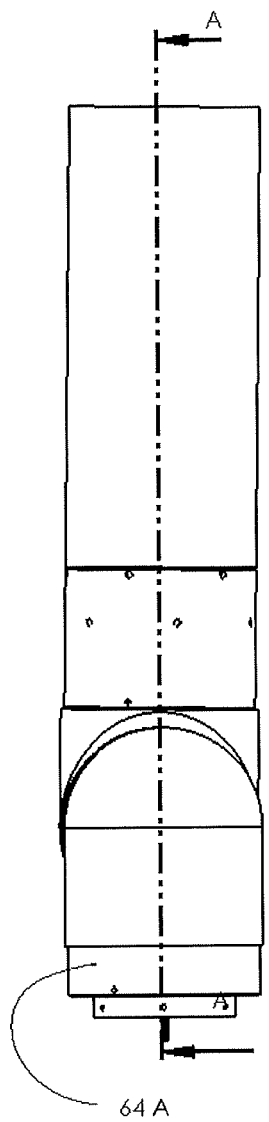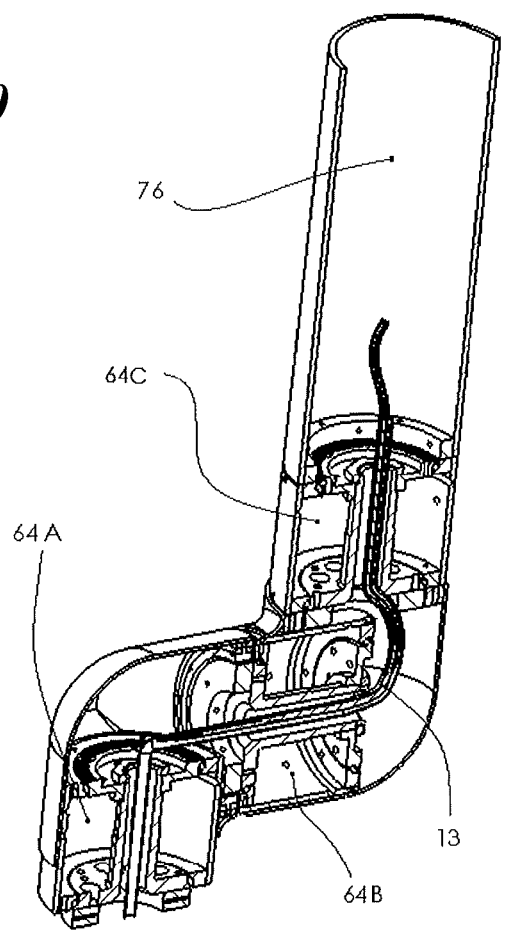
FIG. 30
SECTION A-A
SCALE 1 : 2

DRIVE UNIT FOR ROBOTIC MANIPULATORS

CROSS-REFERENCE TO RELATED APPLICATIONS AND PRIORITY

This patent application claims priority from PCT Patent Application No. PCT/AU2017/000210 filed Oct. 5, 2017. This patent application is herein incorporated by reference in its entirety.

TECHNICAL FIELD

The present invention relates to a robot muscle actuator and its use in a variety of applications, including industrial, service, hobby, entertainment, toy and research robots including prosthetic limbs, exoskeletons, digits and robotic arms.

Applications may also include, machine human interfaces, manufacturing robotics and in the actuation of light and heavy machinery and power tools.

BACKGROUND

| Cited Patent | Filing Date | Publication Date | Applicant | Title |
|---|---|---|---|---|
| PATENT CITATIONS (Precession drive) | | | | |
| CN2035818 U | 14 Sep. 1988 | 12 Apr. 1989 | 杨风博 | Very-short-tooth planetary speed reducer |
| U.S. Pat. No. 7,354,371 B2 | 15 Feb. 2006 | 8 Apr. 2008 | Shinichiro Hazama, etc. | Motor-incorporated hypocycloid-type speed reducer |
| U.S. Pat. No. 4,838,741 A | 1 May 1987 | 13 Jun. 1989 | Jacques Dumoulin | Method for making an epicyclic speed reducer with two stage integral rotor |
| U.S. Pat. No. 8,016,893 B2 | 21 Jun. 2007 | 13 Sep. 2011 | Brian Weinberg, Constantinos Mavroidis, John M. Vranish, NASA | Gear bearing drive |
| CN 103742610 A | 23 Dec. 2013 | 23 Apr. 2014 | Chinese | 2K-V speed reducer |
| EP 0863331 A2 | 10 Feb. 1998 | 9 Sep. 1998 | Somfy | Planetary speed reducer with opposing oblique teeth |
| U.S. Pat. No. 5,401,220 A | Jul. 28, 1993 | Mar. 28, 1995 | Werner H. Heller | Speed reducer with planocentric gear arrangement |
| CN203686041 U | 23 Jan. 2014 | 2 Jul. 2014 | 天利职技师范大学 | Precision 2K-V-type speed reducer |
| CN103742610 A | 23 Dec. 2013 | 23 Apr. 2014 | 陕西科机械减速所限公司 | 2K-V speed reducer |
| WO 2015105914 A1 | | | Adam Charles ELLISON | Transmission and components thereof |
| WO 2015105914 A1 (drawings) | 7 Jan. 2015 | 16 Jul. 2015 | Modbot Pty Ltd, Modbot, Inc. | |
| U.S. Pat. No. 4,604,916 A | 10 Feb. 1984 | 12 Aug. 1986 | Robert G. Distin, Jr. | Epicyclic transmission having cam driven roller retainer |
| WO1995012076 A1 | 25 Oct. 1994 | 4 May 1995 | Erno Raumfahrtte chnik Gmbh | Balanced hypocycloid drive |
| U.S. Pat. No. 7,552,664 B2 | 4 Nov. 2005 | 30 Jun. 2009 | Michael David Bulatowicz | Harmonic drive gear assembly with asymmetrical wave generator and associated flexspline |
| PATENT CITATIONS (Robot Muscle actuator) | | | | |
| U.S. Pat. No. 6,084,373 A | 1 Jul. 1998 | 4 Jul. 2000 | Andrew A. Goldenberg, Nenad Kircanski, Manja Kircanski, Ananth Seshan | Reconfigurable modular joint and robots produced therefrom |

-continued

| Cited Patent | Filing Date | Publication Date | Applicant | Title |
|---|---|---|---|---|
| EP 2532927 A2 | | 12 Dec. 2012 | Ezra Johnson, Doren Thomas W. Van, W. Travis Lontz, Billy Mitchell Coleman | Modularer elektrischer Drehaktuator |
| U.S. Pat. No. 7,081,062 B2 | 14 Nov. 2003 | 25 Jul. 2006 | Delbert Tesar | Standardized rotary actuator |
| U.S. Pat. No. 8,443,684 B2 | 17 Feb. 2010 | 21 May 2013 | Gerhard Thorwart, Rainer Armbruster | Rotary drive device |
| US 20100016114 A1 | 18 Jul. 2008 | 21 Jan. 2010 | Din-Shan Chang | Modular robot control system |
| US 20080070736 A1 | 29 Aug. 2007 | 20 Mar. 2008 | Tsutomu Yoshino, Koichi Oku | Wheel rotating apparatus and in-wheel motor vehicle |
| U.S. Pat. No. 8,348,798 B2 | 29 Jun. 2011 | 8 Jan. 2013 | Chiu-Hsiang Lo | Hub motor for electric vehicles |
| U.S. Pat. No. 3,169,201 A | 15 Feb. 1963 | 9 Feb. 1965 | Herdeg Donald F, Hussey Norman R, Proctor Herbert W, Scott Gifford P, Spring Willard B | Electromagnetic harmonic drive |
| U.S. Pat. No. 7,396,307 B2 | 20 Apr. 2006 | 8 Jul. 2008 | Shinichiro Hazama, Akinori Hoshino | Motor-incorporated hypocycloid-type speed reducer |
| JP2000120810 (A) | 14 Oct. 1998 | 28 Apr. 2000 | SHIBATA TORU, SHIBATA TORU | MOTOR INCORPORATED REDUCTION GEAR |
| US 20080202832 A1 | 10 Jan. 2008 | 28 Sep. 2008 | Xiaolan Ai | High Reduction Ratio Electric Hub Drive |
| US 20020135241A1 | 19 Feb. 2002 | 26 Sep. 2002 | Yukitoshi Kobayashi Kunio Miyashita Toshiki Maruyama Yoshikazu Yajima | Actuator having a wave gear reduction drive |
| U.S. Pat. No. D703, 714 S | 29 Aug. 2013 | 29 Apr. 2014 | Byoungsoo Kim, Seoul (KR), Jungho, Lee, Gyeonggido (KR) | BORING MACHINE |
| US 20140298939 A1 | 26 Oct. 2012 | 9 Oct. 2014 | Byoung-Soo Kim, Jung-Ho Lee | Separable actuator |
| WO 2012169680 A1 | 10 Jun. 2011 | 13 Dec. 2012 | Byoung Soo Kim, 김병수 Jung Ho Lee, 이정호 | Decelerator structure using plurality of two-speed spur gears, and actuator module including same |
| EP 0612591 A1 | 24 Jan. 1994 | 31 Aug. 1994 | Hadi A. Akeel | Motorized rotary joint and method of constructing a modular robot utilizing same |
| EP 0146783 A2 | 20 Nov. 1984 | 3 Jul. 1985 | Herbert Edward Ferree, Thomas Robert Wagner, Michael D. | Improved lightweight electric robotic actuator |

-continued

| Cited Patent | Filing Date | Publication Date | Applicant | Title |
|---|---|---|---|---|
| U.S. Pat. No. 4,678,952 A | 13 Aug. 1985 | Jul. 7 1987 | Hecht, Thomas Joseph Donnelly Thomas W. Peterson, David B. Hole, S. Stanley Mintz | Sealed joint for a robot and the like |
| EP 2532927 B1 | May 14, 2012 | Mar. 12, 2014 | Ezra Johnson, Doren Thomas W. Van, W. Travis Lontz, Billy Mitchell Coleman | Modular rotational electric actuatoractuator |
| International Classifications | | F16H48/34, F16H48/06, B60K1/00 | | |

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

| Term | Description |
|---|---|
| Downstream end | The end of the device closest to the cable loom exit point. |
| Upstream end | The end of the device farthest from the cable loom exit point. |
| Precession drive | A balanced speed reducer |
| Series elastic actuator | An actuator with a spring element positioned in series between the load and the base. |
| SEA | Series elastic actuator |
| Stator mesh | Gear mesh between the stator ring gear and the pinion gears. |
| Output mesh | Gear mesh between the output ring gear and the pinion gears. |
| Mechanical precession | The process of a round part in a round hole rolling in the direction opposite to the rotational direction of the applied radial force. |

In preferred forms, the robot muscle actuator with compound precession speed reducer is a modular component and device that provides bearings, rotational movement, torque, power, positioning and environmental awareness via sensors and a controller for robot joints, powered mounting hubs, servos, track and wheel drives in machines and robots to enable them to be capable of great work.

The device may be used to actuate machine joints, wheels, tracks, omni wheels, linear slides and drives by incorporating one or more devices in a machine or robot all connected to a controller which in turn executes the automation control of the machine or robot. The machine may be a robot, an electric vehicle, a standalone machine or production line system in fact any system that requires automated actuation.

There is a growing demand for high quality low cost actuators for robots and the currently available products are expensive and have limited features and mounting options. To realize a goal of designing robots capable of great work there is demand for a high number of robot actuators per device, all of different sizes from hip joints to finger joints and all need to operate under coordinated control from the control system. Hence the ideal solution actuator would need to be and to have to be best in class, full featured, scalable and be able to be made in great numbers at a low cost to significantly impact total cost of robot ownership. At least some embodiments of the present invention have been designed to meet this growing demand for high quality, economical actuators for a device capable of great work.

The compound precession speed reducer presented has been coined to denote that all motion that is derived from this drive comes from the precession of teeth meshing between the compound pinion and the ring gears that surround or are surrounded by it.

In preferred forms the device may use a compound precession speed reducer which can be configured for an extremely wide range of transmission reduction ratios simply by selecting particular ring gear and pinion teeth number combinations. This means that the robot muscle actuator can be configured with high reduction for robot limb joints and moderate reductions best suitable for robot wheel and track drives and low reductions best suited for fast moving electric vehicles such as but not limited to bikes, scooters, unicycles, skateboards and trikes.

The device has an embedded control system which provides automation and control of the actuation which can be connected to a computer control system which in turn will enable coordinated robot automation. The device is modular and can be configured as a rigid actuator, or as a series elastic actuator (SEA) which means it can be operated with a spring element mounted in series between the transmission and the output outer flange creating a flexible drive transmission. This provides compliance, force sensing, shock load resilience and safety capabilities when operating in proximity to people, animals and the device's surroundings.

In preferred forms the device may have an extremely low moving part count due to the simplicity of the speed reducer and assembly components which in turn aids economy of manufacture, simplicity of service and ease of support.

A separate robot muscle actuator may be used for each degree of movement that a robot has or can be ganged or mounted together to provide mixed actuation. The robot muscle actuator housing may encapsulate high rigidity bearings thus eliminating the need to provide joint bearing by the robot or machine designer.

Embodiments of the robot actuator may provide the most versatile and universal solution for robots, electric powered vehicles and automated systems to enable them for great capabilities. The device has been optimised for simplicity, power density, ease of mounting, high quality linear system behaviour, modularity and a full set of the features in highest demand for robotic, vehicular and automated systems.

In preferred forms the device has an outer housing 10 with mounting hubs each end and an inner hollow core also with mounting hubs at each end. The outer housing rotates about the inner core and is supported by hearings at each end placed between the inner and outer mounting hubs. An electric motor, speed reducer and controller is housed inside the outer housing 10 which drives and controls the outer housing rotation about the inner core 41. The device can be configured with a direct coupling 62 between the transmission and the stator core 41 for rigid servo operation or the direct coupling can be replaced with a spring element 33 to place a spring in series with the drive train which can be highly advantageous for automated systems.

In operation in preferred forms the central hollow stator 41 can be connected via mounting hubs 43 to a robot, a vehicle axle, a machine frame etc. and the outer housing 10 will rotate or provide torque relative to the central stator axis to actuate a load mounted to this outer housing, again via the mounting hubs provided. Wheels, tyres and tracks can be mounted to the outer housing 10 for use in vehicle propulsion.

The speed reducers presented here are balanced compound precession speed reducers referred to in this document as "Precession Drives". In preferred forms the transmission may comprise four main moving and stationary parts and may provide efficient gear transmissions with ratios ranging from 1:1 to extremely high forward and reverse gear ratios of many thousands to one simply by careful selection of gear teeth combinations. Furthermore the four moving part transmission can be configured to provide positive or negative, i.e. forward or reverse transmissions simply by careful selection of teeth mesh ratios. Refer to TABLE. 2 for examples. With these characteristics the transmission is extremely versatile and is well suited for applications with slight or moderate reduction such as is required for electric vehicle transmissions, power tools, and also well suited for high gear reduction precision transmission such as is required for robot and numerical control actuators.

The Precession drive transmission may be used by assembling it into a machine between a prime mover and a load with bearings so you can easily match the speed, power and torque operating conditions of the prime mover to the torque, power and speed requirements of the driven load. In preferred forms the Precession Drive can match almost any input requirements to any output requirements in an efficient, low profile, balanced, hollow centred configuration without the need for additional stages or parts.

Currently most high performance robot actuators incorporate a harmonic drive transmission or pinwheel based cycloidal reducer which imparts considerable expense and device complexity. The Precision drive provides an alternative transmission that is economic, simple, robust, with low backlash and high performance. This invention was inspired by the mechanism of the strain wave transmission although the capabilities of the strain wave transmission appear to have been surpassed by the precession drive transmission given that it can operate with much higher gear reductions per tooth, and operate without the need for the sophisticated mechanisms, manufacturing techniques and materials as found in existing solutions.

In a preferred form the Precession drive transmission utilizes a central rotor with offset crank 26 and bearings which drive the primary gears of a compound pinion 28 into mesh with ring gears that subsequently derives relative motion between these ring gears and hence is a gear reduction transmission. The reduction ratio is set by careful selection of teeth numbers comprising both gear meshes. Refer to TABLE. 2 for example teeth number combinations and resulting gear ratios and output directions.

In a preferred form the robot muscle actuator has a hollow stator which is ideal for routing shafts, cables, fluid lines, control and communication lines and power through the device from end to end and on to other parts of the machine. This means these lines twist on their axes during actuation movement or not at all rather than being pulled in tension or pinched as they would be if they passed outside the periphery of the device during operation and hence this hollow stator core protects these lines from damage and removes exposure to the outside environment.

In a preferred form the robot muscle actuator has matching inner and outer mounting hubs at both ends of the device which are populated with mounting holes which have been optimized for maximum diameter to provide the highest possible system rigidity and high load bearing capacity and versatile mating options for incorporating the device into a machine. Beyond this the outer housing 10 which connects and moves with the output mounting hubs may also have a wide variety of mounting options via the outer housing surface itself or via the variety of mounting holes provided.

In preferred forms an absolute position sensor incorporated into the device provides output position feedback relative to the stator core 41 to the controller. An incremental encoder measures motor rotor movement. With the inclusion of the spring element 33, the controller can perform difference calculations between the output position and motor position to derive the torque between the stator core 41 and the outer housing 10 given the spring element stiffness is known.

In preferred forms this torque sensing capability lends the robot muscle actuator for close, safe interaction with humans, pets, and the devices environment.

In preferred forms the actuator has symmetric input and output mounting hubs at each end of the device which makes attachment and integration into a system very easy given this provides versatile and simple mounting options beyond that of any existing device.

The device is robust against high energy impact loads given the spring element provides 'servo saving' or flexure capabilities which reduce shock loading on the device hence making it less prone to damage if dropped, or if it collides with other objects.

A vernier scale as indicated in FIG. 1 may be incorporated in the device so accurate position measurements can be taken by visual inspection of the scale. This allows easy and accurate device calibration and reconciliation of the devices physical position with that reported via the device's electronic sensors.

In preferred forms this device may also be used in human machine interfaces for human position and movement sensing and also for force feedback to humans enabling rich telepresence operation of remote devices and immersion in virtual reality experiences.

Two or more robot muscles can actuate a single degree of freedom joint operating as antagonistic muscle pairs for variable impedance operation. In fact robot muscle actuators can operate as would a biological muscle to produce complex and lifelike system operation.

In preferred forms the device is optimised for simplicity, power density, ease of mounting, high quality linear system behaviour, modularity and a full set of the features in highest demand for robotic, vehicular and automated systems. These features include but are not limited to hollow centres, double ended hub mounting options, joint, capstan, servo, track or wheel operation, the provision of high rigidity bearings and the capability for free wheeling, direct drive, stiff servo and or series elastic operation.

Examples of electric vehicles include bikes, scooters, unicycles, skateboards and trikes, toys and other vehicles.

The pinion is said to be a compound pinion as the pinion teeth are in mesh with more than one ring gear.

The eccentric rotation of the pinion around the ring gears and the gear teeth in mesh cause the pinion to precess and rotate in the opposite direction relative to the rotor direction at a ratio dictated by the ratios of teeth in mesh. Relative rotation is caused between the two ring gears because the ring gears are in mesh and precession with the compound pinion with varying teeth ratios hence resulting in the implementation of a gear reduction transmission. The reduction ratio is set by careful selection of teeth numbers comprising all gear meshes.

Other preferred embodiments of the invention as shown in FIG. 36 are realized by removing drive train features whilst maintaining the design of the spool shaped stator, the outer housing 10, the mounting hubs 12 and 41 at each end and the arrangement of bearings 37 and 34 that support rotation of the outer housing around the inner stator spool. These embodiments include the fully featured drive train including the motor, reducer and spring element, an embodiment without the spring element an embodiment further excluding the speed reducer and re-introducing the spring element, an embodiment including only the motor drive train element and a further embodiment includes no drive train elements and thus operates as a freewheeling joint with inner spool like stator, an outer housing supported on bearings and including the mounting hubs at each end.

Further embodiments beyond these are configured by including or excluding the controller with the embodiments listed above.

Accordingly in one broad form of the invention there is provided an internally balanced involute-type speed reducer; the reducer comprising a stator stage, an input stage, an output stage, and a plurality of gear sets in mesh.

Preferably the reducer further comprises: a stator ring gear 25 including a row of many gear teeth fixedly connected to a stator core 41.

Preferably, the ring gear is connected to the stator core by a direct coupling.

Preferably the reducer further includes a rotor 26 providing input torque and which is rotatably connected to the stator core 41.

Preferably, the rotor is connected to the stator core about a central axis and inclusive of an offset crank 26 with offset axis parallel to the central axis and offset by a distance of the crank offset.

Preferably, the reducer further includes an offset crank fixedly connected to the rotor, the offset crank rotatably connected to the compound pinion 28.

Preferably, the crank offset of the offset crank is sized to position the compound pinion 28 teeth in mesh on one side with the ring gears 25 and 24.

Preferably, the rotor 26 rotates with gears in mesh between the stator ring gear and pinion teeth; whereby the compound pinion precesses round the stator ring gear.

Preferably, the reducer further includes a counterweight 26A fixedly connected to the rotor 26 and located in a void between the external gears and the ring gears and 180 degrees out of phase with the offset crank of the rotor.

Preferably, the reducer further includes a compound pinion 28 including one or more sets of many gear teeth laid out in rows with compound pinion teeth being in mesh with the stator ring gear 25 and the output gear 24.

Preferably, the compound pinion 28 is rotatably connected to the rotor 26 about the offset crank axis.

Preferably, the reducer further includes an output ring gear 24 coaxial to the stator and comprising: a plurality of gear teeth distributed evenly about the central axis and in constant mesh with the gears of the compound pinion 28; whereby precession of the compound pinion around the stator ring gear 25 induces rotation of the output ring gear about the central axis.

Preferably, the reducer gear ratio is set by difference between the reduction ratio of the compound pinion and stator ring gear and the reduction ratio of the pinion gears and output ring gear.

Preferably, the output rotation direction is determined by whether the ratio of stator ring gear teeth to pinion teeth is greater or less than that between the output ring gear teeth and the teeth of the compound pinion.

Preferably, the compound pinion 28 has two rows of gear teeth, a primary row and an output row that extend from the outer pinion surface and project outwards.

Preferably, a stator ring gear 25 meshes with the pinion primary row of teeth; the stator ring gear teeth extending from the inner surface of the stator ring gear 25 and projecting inwards, and an output ring gear 24 meshing with the teeth of the output row of the compound pinion 28; the teeth of the ring gear extending from the inner surface of the stator ring gear 25 and projecting inwards.

Preferably, the compound pinion primary and output stages are helical gears of opposing hands with helical gear teeth in mesh with pinion teeth of the correct hand to mesh.

Preferably, the gear teeth have a cycloid profile and the internal counterbalance is fixedly connected to the rotor 94 and is located within the inner circumference of the compound pinion.

Preferably, the teeth of both the output ring gear 24 and stator ring gear 25 are rollers which are rotatably connected to each ring gear.

In a further broad form of the invention there is provided an actuator assembly for a robot; said actuator assembly comprising a stator core located within an outer housing and subtended by inner and outer mounting hubs; said hub supporting a drive train and bearings within the actuator assembly.

Preferably, the actuator assembly for a robot further includes:

an outer hollow housing 10 having an outer mounting hub ring 12 fixedly connected at each end, and a stator core 41 passing through the middle of the device with an inner mounting hub ring 43 fixedly connected to the stator core at each end, the hubs being rotatably connected to the outer hub mounting hubs 12.

Preferably, the drive train further comprises:

an electric motor with stator 22 fixedly connected to the stator core 41 and with rotor 21 fixedly connected to the transmission rotor 26, and an output ring gear 24 of many teeth fixedly connected to the outer housing 10, and a stator ring gear 25 fixedly connected via a direct coupling link 62 to the stator core 41.

Preferably, the transmission rotor 26 is rotatably connected to the stator core 41, and has an eccentric crank rotatably connected to the compound pinion 28; the crank offset of the eccentric crank chosen such that the teeth of the compound pinion 28 are kept in mesh with the teeth of the output gear 24 and stator ring gear 25 on one side and kept out of mesh on the opposite side.

Preferably, the assembly further includes a counterbalance mass located between the stator and output ring gears and the compound pinion on the opposite side to the point where pinion and ring gears mesh.

Preferably, the compound pinion 28 includes one or more sets of many gear teeth laid out in rows, the teeth being in mesh with the stator ring gear 25 and the output gear 24; the compound pinion being rotatably connected to the rotor 26 about the offset crank axis.

Preferably, the stator has a hollow centre through its entire length.

Preferably, the gear teeth have an involute profile.

Preferably, the gear teeth are helical gears of opposing hands with helical gear teeth in mesh with pinion also of helical teeth of the correct hand to mesh.

Preferably the gear teeth have a cycloid profile.

Preferably the transmission comprises strain wave gearing.

In a further broad form of the invention there is provided, an internally balanced involute-type speed reducer; the reducer comprising a stator stage, an input stage, an output stage, and a plurality of gear sets in mesh, the reducer further comprising:

a stator ring gear 25 including a row of many gear teeth fixedly connected to a stator core 41 by a direct coupling 62, and a rotor 26 providing input torque rotatably connected to the stator core 41 about a central axis and inclusive of an offset crank 26 with offset axis parallel to the central axis and offset by a distance of the crank offset, and an offset crank fixedly connected to the rotor, the crank rotatably connected to the compound pinion 28; the crank offset sized to position the compound pinion 28 teeth in mesh on one side with the ring gears 25 and 24; the rotor 26 rotating with gears in mesh between the stator ring gear and pinion teeth; whereby the compound pinion precesses round the stator ring gear;

a counterweight 26A fixedly connected to the rotor 26 and located in a void between the external gears and the ring gears and 180 degrees out of phase with the offset crank of the rotor, and a compound pinion 28 including one or more sets of many gear teeth laid out in rows with compound pinion teeth being in mesh with the stator ring gear 25 and the output gear 24; the compound pinion 28 being rotatably connected to the rotor 26 about the offset crank axis, and an output ring gear 24 coaxial to the stator and comprising: a plurality of gear teeth distributed evenly about the central axis and in constant mesh with the gears of the compound pinion 28; whereby precession of the compound pinion around the stator ring gear 25 induces rotation of the output ring gear about the central axis; the reducer gear ratio set by difference between the reduction ratio of the compound pinion and stator ring gear and the reduction ratio of the pinion gears and output ring gear; the output rotation direction set depending on whether the ratio of stator ring gear teeth to pinion teeth is greater or less than that between the output ring gear teeth and the compound pinion 28 teeth.

Preferably, the compound pinion 28 has two rows of gear teeth, a primary row and an output row that extend from the outer pinion surface and project outwards;

a stator ring gear 25 meshes with the pinion primary row of teeth; the stator ring gear teeth extending from the inner surface of the stator ring gear 25 and projecting inwards, and an output ring gear 24 meshing with the teeth of the output row of the compound pinion 28; the teeth of the ring gear extending from the inner surface of the stator ring gear 25 and projecting inwards.

Preferably, the compound pinion primary and output stages are helical gears of opposing hands with helical gear teeth in mesh with pinion teeth of the correct hand to mesh.

Preferably, the gear teeth have a cycloid profile and the internal counterbalance is fixedly connected to the rotor 94 and is located within the inner circumference of the compound pinion.

Preferably, the teeth of both the output ring gear 24 and stator ring gear 25 are rollers rotatably connected to each ring gear.

Preferably, the actuator assembly further includes, an electric motor with motor stator windings 22 fixedly connected to the stator core 41 and motor rotor 21 fixedly connected to the rotor 26, and a plurality of permanent magnets fixedly connected to the motor rotor 21 and evenly spaced around the periphery of the stator.

Preferably, the actuator assembly further includes an outer housing 10 and inner and outer mounting hubs constituting, an outer hollow housing 10 having outer hub rings 12 and 48 fixedly connected at each end, and inner mounting hubs 43 and 41 fixedly connected to each end of the stator core and rotatably connected with the outer mounting hubs.

Preferably, the actuator assembly further includes a hollow centre extending through the stator core 41 from end to end.

Preferably, the inner and outer mounting hubs have a plurality of tapped holes positioned at regular intervals around their axis.

Preferably, an electronic controller, sensors and cable looms are included.

Preferably, the sensors include a position sensing transducer signalling relative and absolute angular displacement of the outer housing relative to the stator core.

Preferably, the actuator assembly is a robot actuator assembly.

Preferably, the hole geometry is the same for corresponding inner and outer mounting hubs at each end of the device.

Preferably, the controller is situated in the void between the motor and the inner and outer mounting hubs at the upstream end of the device and is fixedly connected to the stator core 41.

Preferably, the actuator assembly further includes a plurality of tapped mounting holes on the outer housing.

Preferably, a spring element 33 replaces the direct coupling 62, the spring element elastically connects the stator ring gear 25 to the stator core 41.

Preferably, the stator ring gear 25 is rotatably connected to the outer housing by a bearing about the central axis to ensure gears of the compound pinion and stator ring gear mesh without misalignment despite the stator ring gear being elastically connected to the stator core 10.

Preferably, the two rows of gear teeth of the compound pinion are merged into a single set of many gear teeth laid out in a single row, with teeth extending radially outwards and evenly distributed around the peripheral circumference of the compound pinion and in mesh with both the stator ring gear and the output ring gear.

Preferably, the bearings that rotatably connect the inner and outer hubs are cone bearings.

Preferably, the bearings that rotatably connect the inner and outer hubs are deep groove ball bearings.

Preferably, the bearings that rotatably connect the inner and outer hubs high load roller or crossed roller bearings.

Preferably, the actuator assembly further includes a slip ring device situated in the hollow stator chamber.

Preferably, the actuator assembly further includes vernier inner and outer scales marked on the inner and outer mounting hubs for precise visual readout of actuator angular position.

Preferably, the compound speed reducer is a hybrid precession drive utilizing involute or cycloidal tooth profiles as presented here.

Preferably, the compound speed reducer is an external pinion precession drive utilizing involute or cycloidal tooth profiles as presented here.

Preferably, the compound speed reducer is an inline pinion precession drive, the transmission improvement being that the surfaces teeth protrude from have been placed radially inline to reduce the axial size of the transmission.

In a further broad form of the invention there is provided a robot actuator assembly comprising a stator core, an outer housing, inner and outer mounting hubs, a drive train and bearings constituting:

an outer hollow housing 10 having an outer mounting hub ring 12 fixedly connected at each end, and a stator core 41 passing through the middle of the device with an inner mounting hub ring 43 fixedly connected to the stator core at each end, the hubs being rotatably connected to the outer hub mounting hubs 12, and a drive train comprising:

an electric motor with stator 22 fixedly connected to the stator core 41 and with rotor 21 fixedly connected to the transmission rotor 26, and an output ring gear 24 of many teeth fixedly connected to the outer housing 10, and a stator ring gear 25 fixedly connected via a direct coupling link 62 to the stator core 41, and a transmission rotor 26, which:

is rotatably connected to the stator core 41, and has an eccentric crank rotatably connected to the compound pinion 28, the crank offset chosen such that the teeth of the compound pinion 28 are kept in mesh with the teeth of the output gear 24 and stator ring gear 25 on one side and kept out of mesh on the opposite side, and has a counterbalance mass located between the stator and output ring gears and the compound pinion on the opposite side to the point where pinion and ring gears mesh, and a compound pinion 28 including one or more sets of many gear teeth laid out in rows, the teeth being in mesh with the stator ring gear 25 and the output gear 24 the compound pinion being rotatably connected to the rotor 26 about the offset crank axis.

Preferably, the stator has a hollow centre through its entire length.

Preferably, the gear teeth have an involute profile.

Preferably, the gear teeth are helical gears of opposing hands with helical gear teeth in mesh with pinion also of helical teeth of the correct hand to mesh.

Preferably, the gear teeth have a cycloid profile.

Preferably, the transmission comprises strain wave gearing.

Preferably, the transmission comprises a pinwheel cycloidal transmission.

Preferably, the compound speed reducer is an inline pinion precession drive wherein the surfaces from which teeth protrude are placed radially inline to reduce the axial size of the transmission.

Preferably, a spring element 33 replaces the direct coupling 62, the spring element elastically connects stator ring gear 25 to the stator core 41.

Preferably, the actuator assembly further includes a stator ring gear bearing 28 between the outer housing 10 and the stator ring gear 25 to make the stator ring gear rotatably connected to the outer housing and to maintain the integrity of gear mesh alignment between the stator ring gear and the compound pinion whilst allowing the stator ring gear to be axially displaced relative to the stator core 41 as the spring element 33 is loaded and unloaded by the load on the system.

Preferably, a controller, sensors and cable looms are included.

Preferably, the sensors include a position sensing transducer signalling relative and absolute angular displacement of the outer housing relative to the stator core.

Preferably, the controller is situated in the void between the motor and the inner and outer mounting hubs at the upstream end of the device and is fixedly connected to the stator core 41.

Preferably, where in a void exists in the stator core at the upstream end to allow the cable looms be routed from the controller directly into the hollow stator chamber and also to be routed through the inner hub.

Preferably, the motor is a DC motor.

Preferably, the actuator assembly further includes a position sensing transducer signalling relative and absolute angular displacement between the outer housing and the stator about the central axis.

Preferably, the absolute angular displacement transducer is a dual channel potentiometer.

Preferably, the actuator assembly further includes a slip ring device situated in the hollow stator chamber.

Preferably, the actuator assembly further includes vernier inner and outer scales marked on the inner and outer mounting hubs for precise visual readout of actuator angular position.

Preferably, the compound speed reducer is a hybrid precession drive utilizing involute or cycloidal tooth profiles as presented here.

Preferably, the compound speed reducer is an external pinion precession drive utilizing involute or cycloidal tooth profiles as presented here.

In a further broad form of the invention there is provided a robot actuator assembly comprising a stator core, an outer housing, inner and outer mounting hubs, a motor, a transmission and bearings the constituting:

an outer hollow housing 10 having an outer hub ring 12 fixedly connected at each end, and a stator core 41 passing through the middle of the device with an inner mounting hub ring 43 fixedly connected to the stator core at each end, the hubs being rotatably connected to the outer hub mounting hubs 12, and an electric motor with stator fixedly connected to the stator core and with rotor fixedly connected to the transmission rotor, and a transmission comprising;

an output stage gear fixedly connected to the outer housing with many teeth laid out in rows, the teeth in mesh with the gears of the gear train, and a transmission rotor, which is rotatably connected to the stator core, and is fixedly connected to the electric motor rotor, and a gear train comprising one or more sets of gears each with gear teeth laid out in rows the teeth being in mesh output stage gear and an input gear driven by the motor rotor, and a link fixedly connecting the stator core to the transmission stator stage.

Preferably, the stator has a hollow centre through its entire length.

Preferably, the actuator assembly includes the transmission described above.

Preferably, the gear teeth are helical gears of opposing hands with helical gear teeth in mesh with pinion also of helical teeth of the correct hand to mesh.

Preferably, the gear teeth have a cycloid profile.

Preferably, the transmission uses strain wave gearing.

Preferably, the transmission comprises a pinwheel cycloidal transmission.

Preferably, a spring element is included between the primary ring gear and the stator fixedly connected to each.

Preferably, the actuator assembly further includes a bearing between the outer housing and the stator ring gear to make the stator ring gear rotatably connected to the outer housing.

Preferably, a controller, sensors and cable looms are included.

Preferably, where in a void exists in the stator core to allow the cable looms be routed from the controller directly into the hollow stator chamber and also to be routed through the inner hub.

Preferably, the motor is a DC motor.

Preferably, the actuator assembly further includes a position sensing transducer signalling relative and absolute angular displacement between the outer housing and the stator about the central axis.

Preferably, the absolute angular displacement transducer is a dual channel potentiometer.

Preferably, the actuator assembly further includes a slip ring device situated in the hollow stator chamber.

Preferably, the actuator assembly further includes dust and water tight seals on each cone bearing.

Preferably, the compound speed reducer is a hybrid precession drive utilizing involute or cycloidal tooth profiles as presented here.

Preferably, the compound speed reducer is an external pinion precession drive utilizing involute or cycloidal tooth profiles as presented here.

Preferably, the compound speed reducer is an inline pinion precession drive, the transmission improvement being that the surfaces teeth protrude from have been placed radially inline to reduce the axial size of the transmission.

In a further broad form of the invention there is provided a sunless, single pinion compound planetary gear transmission the improvement comprising a stator stage, an input stage, an output stage, and a plurality of gear sets with involute tooth profiles, the assembly constituting:

a stator ring gear 25 with axis intersecting the central rotor axis of rotation and comprising:

a hollow centre and a primary row of many gear teeth distributed evenly about the central axis, and a connector fixedly connecting the stator ring gear to the stator, and a compound pinion 28 connected to the rotor 26 such that it is free only to rotate relative to the rotor about the offset crank axis, including one or more sets of many gear teeth laid out in rows, with each set of gear teeth evenly distributed around the surface of the compound pinion, and a rotor 26 providing input torque about a central axis and constituting:

an offset crank 26 with an offset crank axis of rotation parallel to the central axis and offset by a distance of the crank offset, and a connection with the compound pinion 28 such that the compound pinion is free to move relative to the rotor only in rotation about the offset crank axis, and an offset crank distance such that the gear teeth of the compound pinion are brought into mesh with those of the stator ring gear 25 and output ring gear 24 causing, precession of the compound pinion around the stator ring gear from the primary gear set in mesh with the stator gears, and rotation of the output ring gear caused by the precession of the pinion around the output ring gear from gears of the output ring gear being in mesh with the pinion secondary gear set, and an output ring gear 24 with axis intersecting the central rotor axis and comprising:

a hollow centre and a plurality of gear teeth distributed evenly about the central axis and in constant mesh with the secondary gears of the compound pinion which in turn induces rotation of the output ring gear with gear ratio set by difference between the reduction ratio of the primary pinion and stator ring gear and the reduction ratio of the secondary pinion gears and output ring gear.

Preferably, the compound pinion 28 has two rows of gear teeth, a primary row and an output row that extend from the outer pinion surface and project outwards, and stator ring gear 25 meshes with the pinion primary row of teeth and ring gear teeth extend from the inner surface and project inwards, and output ring gear 24 meshes with the pinion output stage teeth and ring gear teeth extend from the inner surface and project inwards.

Preferably, the rotor 26 incorporates a counterbalance positioned diametrically opposite to the crank offset and radially positioned interstitially in the void that occurs due to the crank offset in between the outer ring gears 24 and 25 and the compound pinion 28 periphery that statically and dynamically balances the device axially and radially.

Preferably, the compound pinion primary and output stages are helical gears of opposing hands with helical gear teeth in mesh with pinion teeth of the correct hand to mesh.

Preferably, a hollow centre extends from end to end.

Preferably, an actuator assembly incorporating a transmission including precession drive further includes a motor 14 with motor stator connected to the stator 41 and with axis of rotation common to the central axis of the rotor and connected with the rotor.

Preferably, the actuator assembly further includes a stator core, an outer housing, inner and outer mounting hubs and bearing assembly constituting:

an outer housing and comprising a hollow cylindrical drum encapsulating all other parts, and two outer mounting hubs at each end of the outer housing fixedly connected to the outer housing, and inner mounting hubs connected to the outer hub rings such that the only movement allowed of the outer mounting hubs relative to the inner mounting hubs is rotation about the central axis, and a stator core passing through the middle of the device, internal and on the same central axis as the motor and fixedly connected to the inner mounting hubs positioned at each end, and bearings situated between the inner and outer mounting hubs ensuring rotation of outer mounting hubs relative to inner mounting hubs is about the central axis.

Preferably, the inner and outer mounting hubs have a plurality of tapped holes positioned at regular intervals around their axis.

Preferably, a controller, sensors and cable looms are included.

Preferably, the actuator assembly further includes a position sensing transducer signalling relative and absolute angular displacement of outer housing relative to the stator about the central axis.

Preferably, the actuator assembly is a robot actuator assembly.

Preferably, the inner mounting hubs and outer mounting hubs are connected to a robotic limb to form an articulated joint.

Preferably, the inner mounting hubs and outer mounting hubs are connected to a robot end effector for articulation.

Preferably, all gear teeth profiles are involute gear profiles configured such that:

no interference occurs between gears in mesh, and a hollow stator can pass through the device end to end.

Preferably, the hole geometry is the same for corresponding inner and outer mounting hubs at each end of the device.

Preferably, the controller is situated in the void between the motor and the inner and outer mounting hubs at the upstream end of the device.

Preferably, the actuator assembly further includes a plurality of rings of tapped mounting holes on the outer housing around and with centres emanating radially from the central axis.

Preferably, the two rows of gears of the compound pinion are merged into a single set of many gear teeth laid out in a single row, with teeth extending radially outwards and evenly distributed around the peripheral circumference of the compound pinion and in mesh with both the stator ring gear and the output ring gear.

Preferably, the gear teeth numbers are selected such that tooth addendum, dedendum and centre distance modifications are not required to avoid gear interference.

Preferably, the interference is a trochoid interference or a trimming interference.

Preferably, all gear teeth profiles are cycloid gear profiles.

Preferably, all gear teeth profiles are roller and sprocket mesh gear profiles.

Preferably, the motor is a direct current motor.

Preferably, the bearings are cone bearings.

Preferably, the bearings are deep groove ball bearings.

Preferably, the bearings are high load bearings.

Preferably, a spring element fixedly connects the primary ring gear and the stator.

Preferably, the primary ring gear is connected to the outer housing by a bearing which allows only rotation of the primary ring gear relative to the outer housing about the central axis.

Preferably, the compound speed reducer is an inline pinion precession drive, the transmission improvement being that the surfaces teeth protrude from have been placed radially inline to reduce the axial size of the transmission.

Preferably, the pinion has two rows of gear teeth, a primary row and an output row with gear teeth that extend from the inner pinion surface and project inwards, and stator ring gear teeth extend from the outer surface and project outwards, and output ring gear teeth extend from the outer surface and project outwards.

Preferably, the rotor incorporates a counterbalance positioned 180 degrees out of phase with the crank offset.

Preferably, the pinion primary and output stages are helical gears of opposing hands and helical gear teeth in mesh with pinion teeth are of the correct hand to mesh.

Preferably, the rotor incorporates a counterbalance positioned 180 degrees out of phase with the crank offset.

Preferably, the pinion primary and output stages are helical gears of opposing hands and helical gear teeth in mesh with pinion teeth are of the correct hand to mesh.

Preferably, the rotor incorporates a counterbalance positioned 180 degrees out of phase with the crank offset.

Preferably, the pinion primary and output stages are helical gears of opposing hands and helical gear teeth in mesh with pinion teeth are of the correct hand to mesh.

Preferably, all sets of gears are axially aligned.

Preferably, the rotor incorporates a counterbalance positioned 180 degrees out of phase with the crank offset.

Preferably, the pinion primary and output stages are helical gears of opposing hands and helical gear teeth in mesh with pinion teeth are of the correct hand to mesh.

Preferably, all gear teeth profiles are cycloid gear profiles.

Preferably, all gear teeth profiles are roller and sprocket mesh gear profiles.

Preferably, the compound speed reducer is an inline pinion precession drive, the transmission improvement being that the surfaces from which teeth protrude are placed radially inline to reduce the axial size of the transmission.

Preferably, the transmission is incorporated into a power tool.

Preferably, the transmission is incorporated into a sail winch.

Preferably, the transmission is incorporated into an electric vehicle.

Preferably, the transmission is incorporated into an exoskeleton for humans.

Preferably, the transmission is incorporated into a robot.

Preferably, the transmission is incorporated into automated vehicle assemblies.

Preferably, the transmission is incorporated into photographic equipment.

Preferably, the transmission is incorporated into marine vessel transmissions.

Preferably, the transmission is incorporated into heavy earth moving equipment.

Preferably, the transmission is incorporated into a motor vehicle transmissions.

Preferably, the transmission is incorporated into a radio control servo.

Preferably, the transmission is incorporated into a CNC machine.

Preferably, the transmission is incorporated into a toy.

Preferably, the transmission is incorporated into a camera gimbal.

In yet a further broad form of the invention there is provided a modular scalable actuator assembly the improvement comprising a dual purpose wheel and joint actuator function, integrated hub bearings and double ended presentation of stator and output mounting hubs, the assembly incorporating:

an inner spool shaped stator 41 rotatably connected at each end at a location radially and at the periphery of the spools outer rims via hub bearings 37 and 34 to an infinitely rotatable outer housing 10, and inner mounting hubs 41 and 43 fixedly connected to the stator core 41 at each end at a location radially at the periphery of the spools outer rims, and outer mounting hubs 12 and 48 fixedly connected at each outer end of the outer housing 10.

Preferably, the modular scalable actuator assembly further includes an electric motor in between inner mounting hub 41 and inner mounting hub 43 with motor stator windings 22 fixedly connected to the stator core 41 and motor rotor 21 fixedly connected to the outer housing 10.

Preferably, the modular scalable actuator assembly further includes a spring element 33, elastically connecting the motor rotor 21 to the outer housing 10.

Preferably, the modular scalable actuator assembly further includes a bearing which rotatably connects the outer housing 10 to the rotor 21 to ensure the rotor rotation is concentric relative to the stator during operation.

Preferably, the modular scalable actuator assembly further includes a speed reducer with input stage fixedly connected to the motor rotor 21, and stator stage fixedly connected to the stator core 41 and, an output stage fixedly connected to the outer housing 10.

Preferably, the modular scalable actuator assembly further includes a spring element 33, that decouples the speed reducer stator stage from being fixedly connected to the stator core 41 and in turn elastically connects the stator core 41 to the speed reducer stator stage 25.

Preferably, the modular scalable actuator assembly further includes a bearing which rotatably connects the outer housing 10 to the speed reducer stator stage 25 to ensure the speed reducer stator stage rotation is concentric relative to the speed reducers rotational centre.

Preferably, the modular scalable actuator assembly further includes an electronic controller 11.

Preferably, the modular scalable actuator assembly further includes a hole through the stator core 41 from end to end.

Preferably, the modular scalable actuator assembly further includes a hole allowing the electronic controller wires to exit the device through the inner mounting hub 41 at the upstream end or to exit the device directly into the hole running through the stator core 41.

Preferably, the bearings 34 and 27 are adjustable cone bearings.

Preferably, the bearings 34 and 27 are adjustable cone, tapered roller or roller bearings.

Preferably, all bearings are adjustable cone, tapered roller or roller bearings.

Preferably, the modular scalable actuator assembly further includes a controller board and position sensing instruments that measure the rotation of the outer housing 10 relative to the stator core 41 in relative or absolute displacement values.

In yet a further broad form of the invention there is provided, a modular scalable actuator assembly, the improvement comprising dual purpose wheel and joint actuator function, integrated hub bearings and double ended presentation of stator and output mounting hubs, the assembly constituting:

an inner hollow spool shaped stator 41 rotatably connected at each end at a location radially and at the periphery of the spools outer rims via hub bearings 37 and 34 to an infinitely rotatable outer housing 10, and inner mounting hubs 41 and 43 fixedly connected to the stator core 41 at each end at a location radially at the periphery of the spools outer rims, and outer mounting hubs 12 and 48 fixedly connected at each outer end of the outer housing 10.

Preferably, the modular scalable actuator assembly further includes an electric motor in between inner mounting hub 41 and inner mounting hub 43 with motor stator windings 22 fixedly connected to the stator core 41 and motor rotor 21 fixedly connected to the outer housing 10.

Preferably, the modular scalable actuator assembly further includes a spring element 33, elastically connecting the motor rotor 21 to the outer housing 10.

Preferably, the modular scalable actuator assembly further includes a bearing which rotatably connects the outer housing 10 to the rotor 21 to ensure the rotor rotation is concentric relative to the stator during operation.

Preferably, the modular scalable actuator assembly further includes a precession drive with input stage fixedly connected to the motor rotor 21, and a stator stage fixedly connected to the stator core 41 and, an output stage fixedly connected to the outer housing 10.

Preferably, the modular scalable actuator assembly further includes a spring element 33, that decouples the speed reducer stator stage from being fixedly connected to the stator core 41 and in turn elastically connects the stator core 41 to the speed reducer stator stage 25.

Preferably, the modular scalable actuator assembly further includes a bearing which rotatably connects the outer housing 10 to the speed reducer stator stage 25 to ensure the speed reducer stator stage rotation is concentric relative to the speed reducers rotational centre.

Preferably, the modular scalable actuator assembly further includes an electronic controller 11.

Preferably, the modular scalable actuator assembly further includes a spline coupling between the stator core and the inner downstream mounting hub to transmit torque between these parts whilst also allowing bearing loading adjustment via tensioning of bolts joining both sides of the outer housing.

Preferably, the modular scalable actuator assembly further includes a hole allowing the electronic controller wires to exit the device through the inner mounting hub 41 at the upstream end or to exit the device directly into the hole running through the stator core 41.

Preferably, the bearings 34 and 27 are adjustable ball or roller cone bearings.

Preferably, the modular scalable actuator assembly further includes a controller board and position sensing instruments that measure the rotation of the outer housing 10 relative to the stator core 41 in relative or absolute displacement values and to measure motor rotor rotation and other telemetry data.

In yet a further broad form of the invention there is provided an internally balanced hybrid speed reducer assembly the improvement comprising ring gears and pinion are all located in the same plane the assembly comprising a stator stage, an input stage, an output stage, and a plurality of gear sets in mesh, the assembly comprising:

a stator ring gear 60 including a row of many gear teeth fixedly connected to a stator core 41 by a direct coupling 62, and a rotor 26 providing input torque rotatably connected to the stator core 41 about a central axis and inclusive of an offset crank 57 with offset axis parallel to the central axis and offset by a distance of the crank offset, and an offset crank fixedly connected to the rotor, the crank is rotatably connection to the compound pinion 58, the crank offset is sized to position the compound pinion 58 teeth in mesh on the outer side with the output ring gear 59 and on the inside with the stator ring gear 60. Rotation of the rotor 26 with gears in mesh between the stator ring gear and pinion teeth precession occurs of the compound pinion round the stator ring gear, and a counterweight fixedly connected to the offset crank 57 and located in the void inside the output ring gear 59 and 180 degrees out of phase with the offset crank of the rotor, and a compound pinion 58 including one sets of many internal gear teeth and one set of external gear teeth laid out in rows with compound pinion teeth being in mesh with the stator ring gear 60 and the output gear 59 the compound pinion being rotatably connected to the rotor 26 about the offset crank axis, and an output ring gear 59 coaxial to the stator and comprising:

a plurality of internal gear teeth distributed evenly about the central axis and in constant mesh with the gears of the compound pinion 58. Precession of the compound pinion around the stator ring gear 60 induces rotation of the output ring gear about the central axis. The reducer gear ratio is set by difference between the reduction ratio of the pinion and stator ring gear and the reduction ratio of the pinion gears and output ring gear.

Preferably, the gear teeth profiles are cycloidal.

Preferably, the gear teeth profiles are involute.

In yet a further broad form of the invention there is provided an internally balanced inline speed reducer assembly; the improvement being that the surfaces that compound pinion 108 teeth protrude from for both pinion teeth sets have been placed radially inline to reduce the axial size of the transmission; the assembly comprising a stator stage, an input stage, an output stage, and a plurality of gear sets in mesh, the assembly constituting:

a stator ring gear 105 including a row of many gear teeth fixedly connected to a stator core 41 by a direct coupling 62, and a rotor 106 providing input torque rotatably connected to the stator core 41 about a central axis and inclusive of an offset crank 106 with offset axis parallel to the central axis and offset by a distance of the crank offset, and an offset crank fixedly connected to the rotor; and wherein the crank is rotatably connected to the compound pinion 108, the crank offset is sized to position the compound pinion 108 teeth in mesh on the outside of the outer teeth with the output ring gear 104 teeth also on the outside of the inner pinion teeth with the stator ring gear 105 teeth; and wherein with rotation of the rotor 106 with gears in mesh between the stator ring gear and pinion teeth precession occurs of the compound pinion round the stator ring gear, and a counterweight fixedly connected to rotor 106 and 180 degrees out of phase with the offset crank of the rotor, and a compound pinion 108 including one or more sets of many gear teeth laid out in rows with compound pinion teeth being in mesh with the stator ring gear 105 and the output gear 104 the compound pinion being rotatably connected to the rotor 106 about the offset crank axis, and an output ring gear 104 coaxial to the stator and comprising:

a plurality of internal gear teeth distributed evenly about the central axis and in constant mesh with the gears of the compound pinion 108; and wherein precession of the compound pinion around the stator ring gear 105 induces rotation of the output ring gear about the central axis; and wherein the reducer gear ratio is set by difference between the reduction ratio of the pinion and stator ring gear and the reduction ratio of the pinion gears and output ring gear; and wherein the output rotation direction is set depending on whether the ratio of stator to pinion is greater or less than that between the output ring gear and the pinion.

Preferably, the gear teeth profiles are cycloidal.

Preferably, the gear teeth profiles are involute.

In yet a further broad form of the invention there is provided, a spring bearing assembly for planetary gear trains, the improvement comprising the implementation of a non-rotating spring operating as single degree of freedom system, the assembly constituting:

a spring element 33, elastically connecting the motor rotor 21 to the outer housing 10, and a bearing which rotatably connects the outer housing 10 to the rotor 21 to ensure the rotor rotation is concentric relative to the stator during operation.

In yet a further broad form of the invention there is provided, in combination, an actuator and compound precession speed reducer which provides bearings, rotational movement, torque, power, positioning and environmental awareness via sensors and a controller for robot joints, powered mounting hubs, servos, track and wheel drives in machines and robots; the actuator including:

a modular scalable actuator housing; the housing providing dual purpose wheel and joint actuator function, integrated hub bearings and double ended presentation of stator and output mounting hubs, the housing comprising;

an inner hollow stator core 41A rotatably connected to an outer housing 10, and inner mounting hubs 41 and 43 fixedly connected to the stator core 41A at each end at a location radially at the periphery of the spools outer rims, and outer mounting hubs 12 and 48 fixedly connected at each outer end of the outer housing 10;

the speed reducer comprising:

a stator ring gear 25 including a row of many gear teeth fixedly connected to a stator core 41 by a direct coupling 62, and a rotor 26 providing input torque rotatably connected to the stator core 41 about a central axis and inclusive of an offset crank 26 with offset axis parallel to the central axis and offset by a distance of the crank offset, and an offset crank fixedly connected to the rotor, the crank is rotatably connected to the compound pinion 28, the crank offset is sized to position the compound pinion 28 teeth in mesh on one side with the ring gears 25 and 24; and wherein rotation of the rotor 26 with gears in mesh between the stator ring gear and pinion teeth precession occurs of the compound pinion round the stator ring gear, and a counterweight fixedly connected to rotor 26 and located in the void between the external gears and the ring gears and 180 degrees out of phase with the offset crank of the rotor.

Preferably, the inner hollow stator core 41A is connected at each end to the outer housing 10 at a location radially and at the periphery of the outer rims of the spools via hub bearings.

BRIEF DESCRIPTION OF DRAWINGS

Embodiments of the present invention will now be described with reference to the accompanying drawings wherein:

FIG. 4 is a front view of the robot muscle actuator of

FIG. 1 viewed from the downstream side.

FIG. 10 illustrates a Balanced involute-type speed reducer (Precession drive) assembly as viewed from the downstream on the left and upstream sides on the right;

FIG. 22 bottom view shows an embodiment of the actuator configured with a direct coupling which connects the stator ring gear to the stator core thus providing a rigid transmission

FIG. 27 right hand view illustrates a Robot muscle implemented as a dual tendon capstan drive.

FIG. 30 on the left is the is a view of the robotic arm elbow of FIG. 29 and on the right is sectioned view A-A of the robotic arm elbow of FIG. 29 showing the outer housing, cone bearings, stator and mounting hubs of the robotic muscle actuator of FIG. 1.

FIG. 32 on the right is a view of the same robot muscle actuator on the left included here for additional clarity.

DETAILED DESCRIPTION OF PREFERRED EMBODIMENTS

First Embodiment

A first embodiment of a robot muscle actuator 64 with precession drive 23 of the present invention is illustrated in FIG. 1 to FIG. 6.

Figure 1:
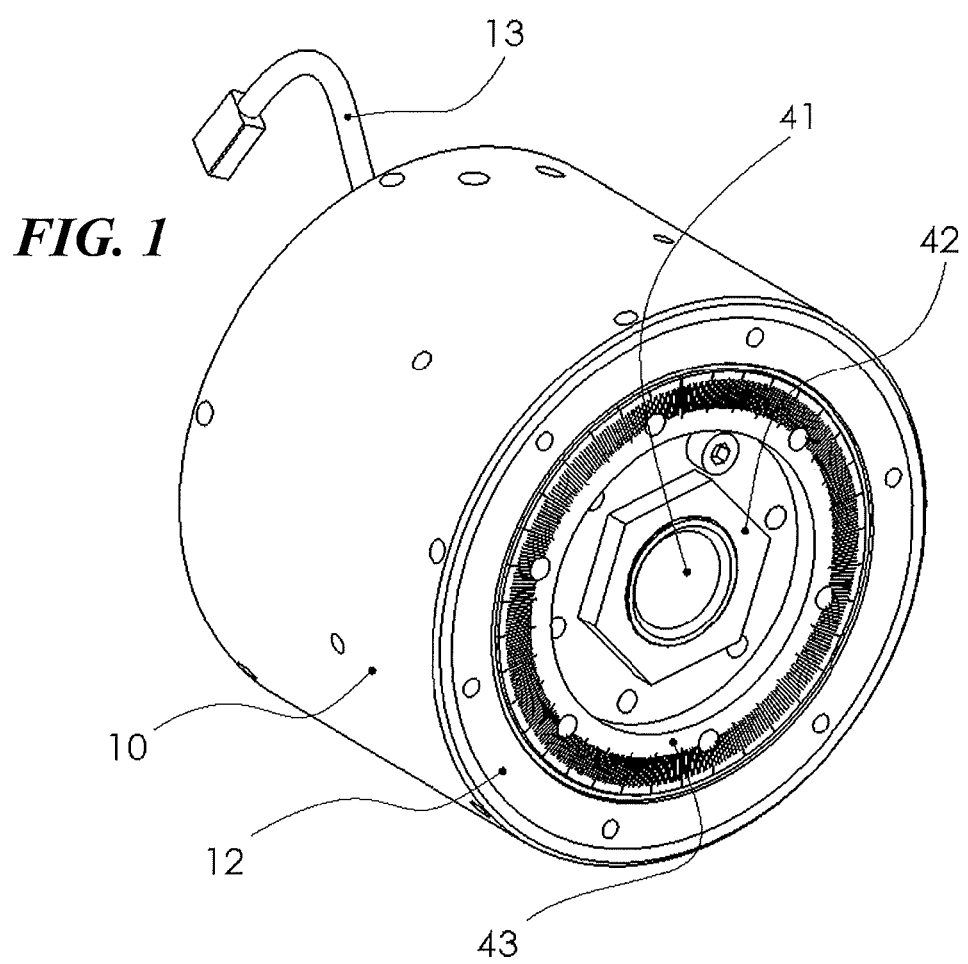
FIG. 1 is a perspective view of a first preferred embodiment of a robot muscle actuator
Figure 2:
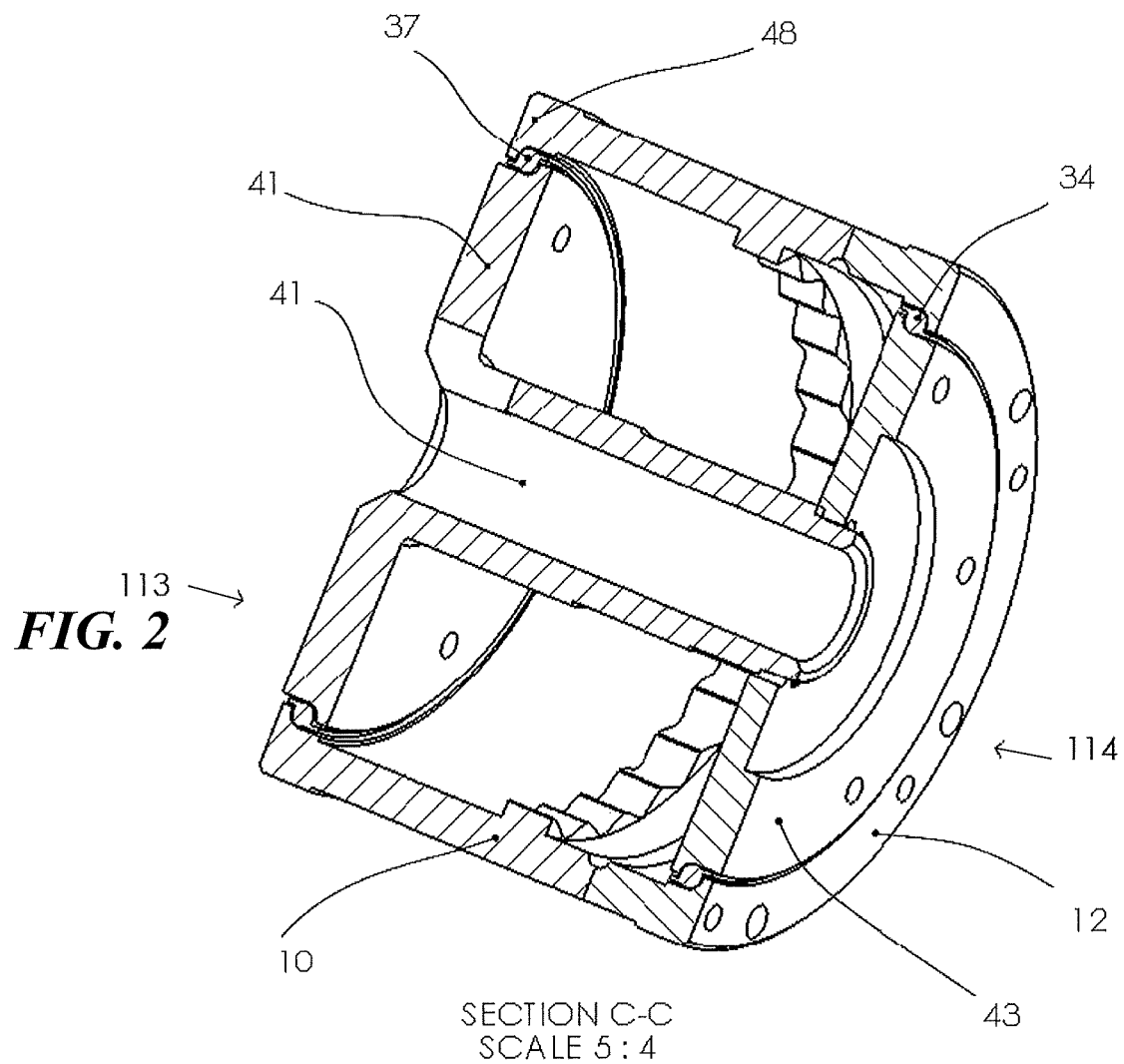
FIG. 2 is a sectioned 3D view of the robot muscle actuator of FIG. 1.
Figure 3:
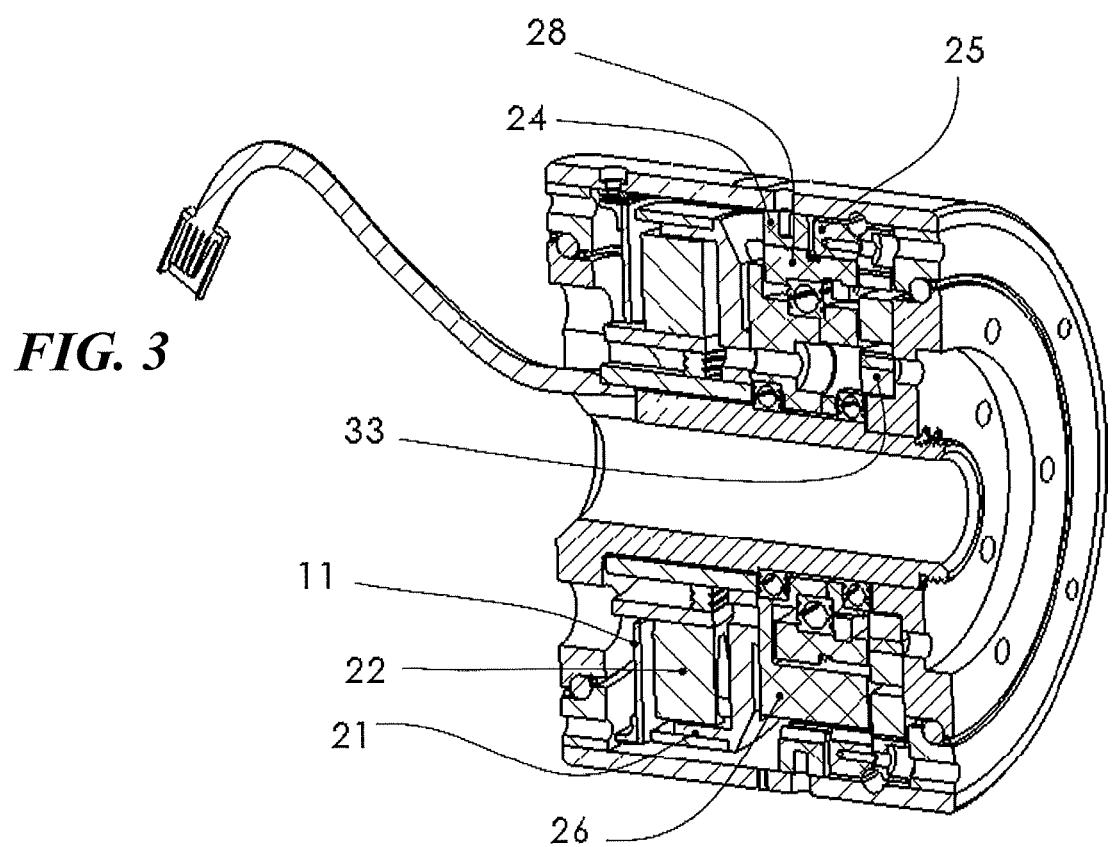
FIG. 3 is a sectioned view showing internal details of components comprising the robot muscle actuator of FIG. 1.
Figure 4:
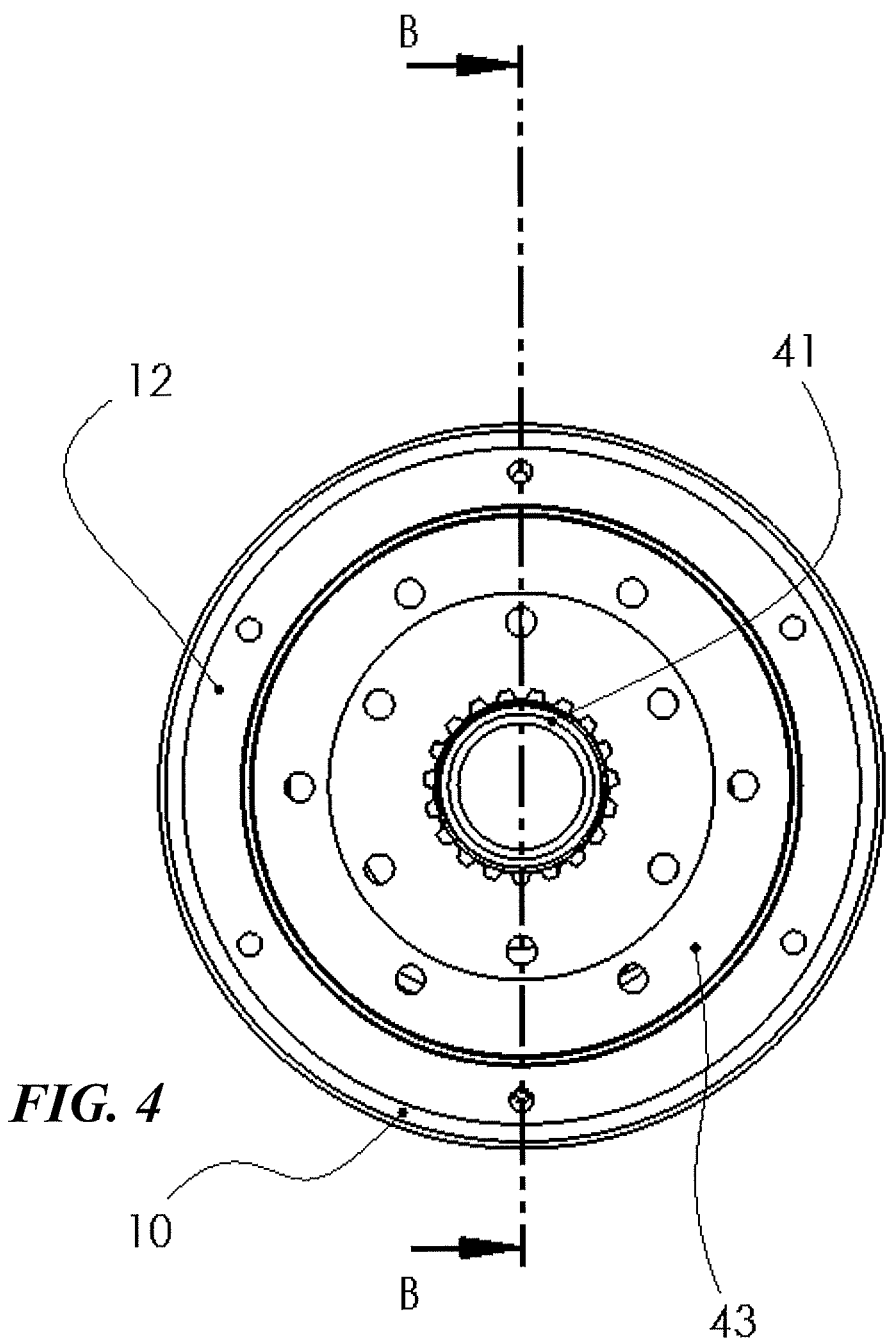
Figure 5:
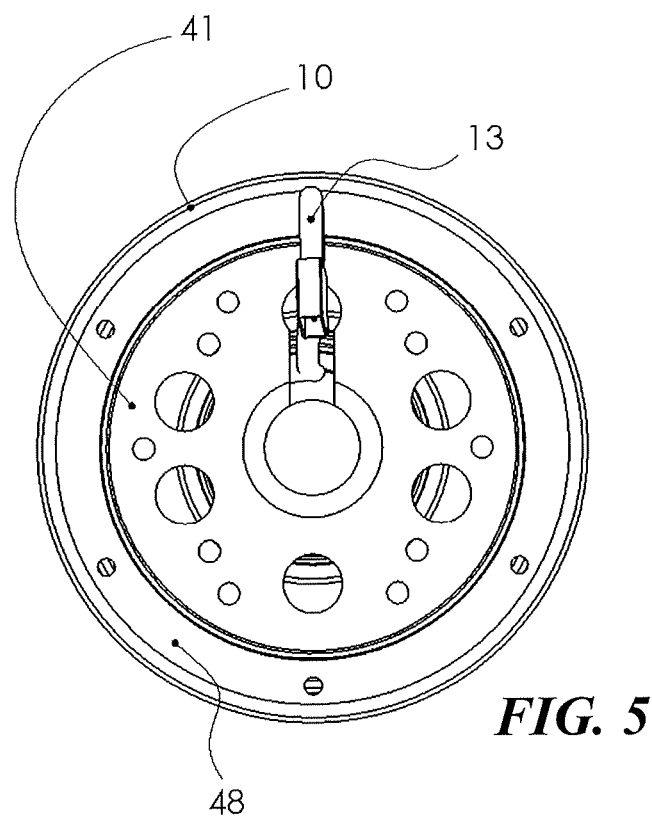
FIG. 5 is the back view of the robot muscle actuator from FIG. 1 viewed from the upstream side.
Figure 6:
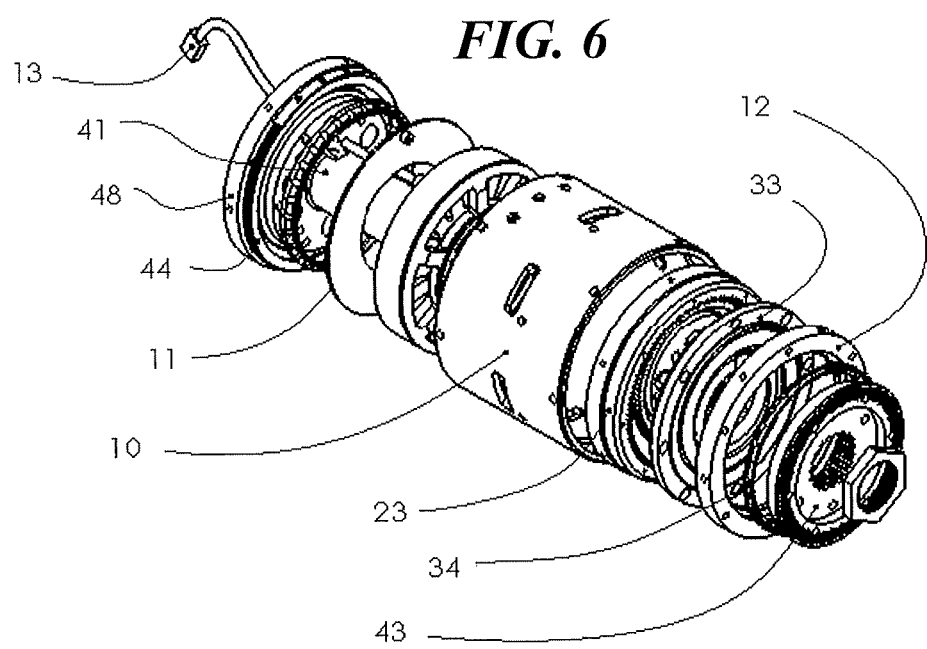
FIG. 6 is an exploded view of the robot muscle actuator of FIG. 1 showing components and subassemblies comprising the embodiment.

FIG. 1 is a view of a first preferred embodiment of a robot muscle actuator; FIG. 1 more specifically is a 3D view of an electric motor actuator with precession drive transmission supporting stiff servo or series elastic actuator embodiments of a robot muscle actuator and optional controller. A Vernier scale is included on the outer and inner hubs for accurate manual reading of actuator displacement;

FIG. 2 is a sectioned 3D view of the robot muscle actuator showing outer housing 10, hollow stator core, mounting hubs and hub bearings only. Drive train has been omitted for clarity. FIG. 2 illustrates a Section View showing Outer housing, hollow stator core, mounting hubs and hub bearings only. Drive train has been omitted for clarity; FIG. 2 drive train components have been omitted in this configuration to show this novel actuator bearing and hub mounting configuration which is optimised for low weight, high rigidity, high versatility, hollow, scalable and adjustable housings for joints, hubs and actuators. This is the simplest embodiment which can be used as an unpowered joint or wheel hub;

FIG. 3 is a sectioned view showing internal details of components comprising the robot muscle actuator of FIG. 1; FIG. 3 illustrates a Robot muscle actuator front view as seen from the downstream end on the left and shown as section B-B on the right; FIG. 3 features include speed reducer, offset crank counter balance 26, hollow central stator shaft, stator ring gear 25, series elastic spring element 33, controller circuit board 11 and other components comprising this embodiment;

FIG. 4 is the front view of robot muscle actuator from FIG. 1 viewed from the downstream side; FIG. 4 illustrates a Robot muscle actuator front view as seen from the downstream end on the left and shown as section B-B on the right;

FIG. 5 is the back view of robot muscle actuator from FIG. 1 viewed from the upstream side; FIG. 5 illustrates a Robot muscle actuator back view as seen from the upstream end;

FIG. 6 is an exploded view of the robot muscle actuator of FIG. 1 showing components and subassemblies comprising the invention; FIG. 6 illustrates an Exploded view of robot muscle actuator;

The robot muscle actuator 64 is cylindrical in shape and in most but not necessarily all cases may have a hollow centre providing a channel for cabling, hoses and the routing of other connectors to pass through the device from end to end as required. The device may have an external 12 and internal 42 coaxial hub at each end.

The robot muscle actuator 64 shown in FIG. 2 includes an inner hollow stator core 41 passing axially through the centre of the device supporting on bearings at each end an outer housing 10 which is actuated for rotational motion by an internal drive train. The drive train includes an electric motor 14 which drives a speed reducer transmission 23. The speed reducer is fixedly connected to the stator via a direct coupling 62 or a spring element 33 which places the spring element or direct coupling in series with the drive train. The precession drive output drives the outer housing 10 in rotation, torque or positioning.

The bearings at each end of the device can be pre-loaded to prevent any play, flex, backlash or misalignment from occurring in the device even under high static, dynamic and impact triaxle loading. The stator inner mounting hub 43 at the downstream end of the stator is fixedly connected to the stator core in such a way that torque is transferred between the stator core and the stator hub whilst also allowing the stator hub to pre-load the hub bearing. The device has identical stator inner and outer housing outer mounting hubs at both ends of the device which are populated with mounting holes. Placement of these holes has been optimized for maximum diameter to provide the highest possible mounting rigidity and load bearing capacity and also for versatile mounting options for incorporating the device into a machine.

Beyond this the outer housing 10 which rotates with the output mounting hubs 12 and 48 also has a wide variety of mounting options via the hub surface itself and via the variety of mounting holes provided.

The robot muscle actuator prime mover is an electric motor 14 with the motor stator 22 fixedly connected to the stator core and upstream inner hub 41. The motor stator 22 is surrounded by a motor rotor 21 including magnets commonly known as an outrunner motor. The motor rotor 21 is rotatably connected by bearings to the stator core 41 and fixedly connected to rotor with offset crank 26. The hollow stator 41, bearings 34 and offset crank 26 can be seen in FIG. 3 section view. Rotor bearings 30 and 31 support the rotors motion about the central axes.

The balanced compound speed reducer comprises a stator ring gear 25, a rotor with offset crank 26, a compound pinion 28 and an output ring gear 24 and bearings 30, 31 and 29, the improvement being the addition of a counterbalance mass fixedly connected to the rotor 26 which axially and radially balances the rotating components to avoid vibration. The actuator can provide very low backlash with high efficiency and performance at a low cost.

Figure 11:
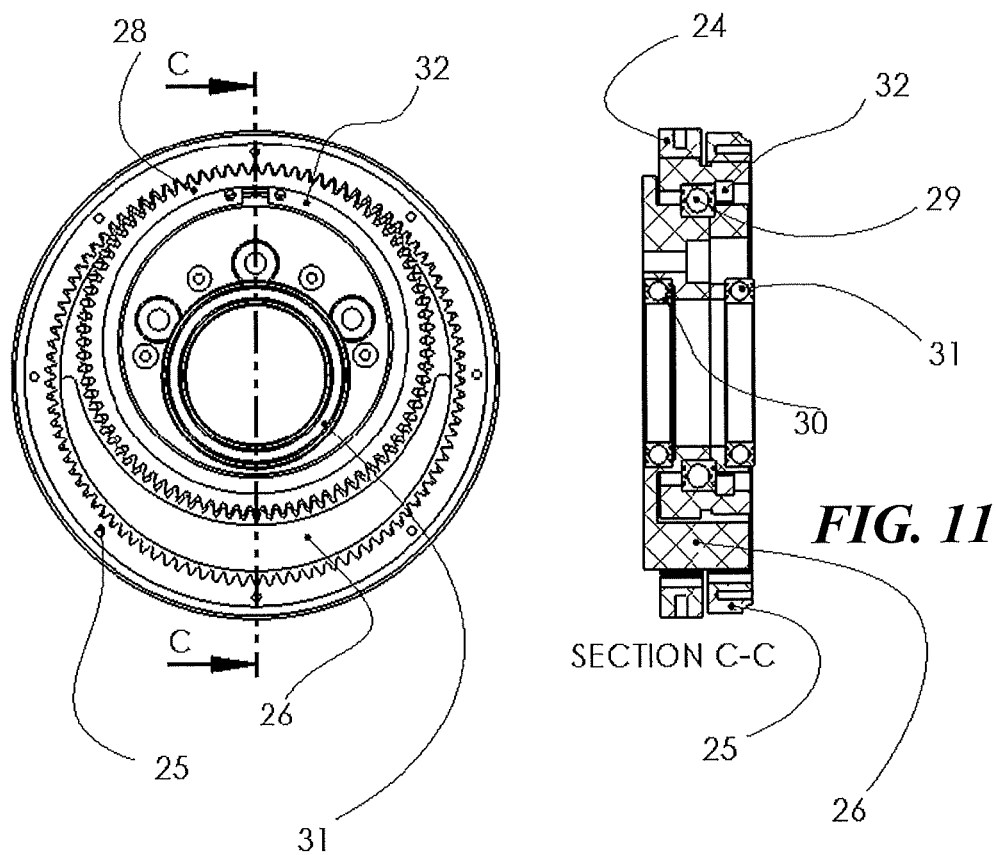
FIG. 11 on the left shows the precession drive subassembly viewed from the downstream side and on the right shows a section view C-C of the subassembly shown on the left to reveal the part geometry, inter-relatedness and organization.

The rotor 26 has an eccentric crank feature for affixing a bearing which gives the bearing the same eccentricity about the rotors central axis as can be seen in left view on FIG. 11. A compound pinion 28 is rotatably connected to the pinion bearing 29 which gives the compound pinion the same eccentricity about the rotors central axes as the pinion bearing 29 and offset crank. This eccentricity is set such that the teeth of the compound pinion 28 form a mesh on one side with the teeth on the stator ring gear 25 and output ring gear 24 and do not mesh on the opposite side. The mesh between the stator ring gear teeth and the compound pinion teeth is the stator mesh and the mesh between the output ring gear 24 and the compound pinion 28 is the output mesh.

Torque from the motor rotor 21 provides the input to the speed reducer causing the rotor with offset crank 26 to rotate about the central axis.

As the rotor with offset crank 26 rotates the stator mesh causes the compound pinion 28 to precess around the stator ring gear 25. As the stator ring gear 25 is fixedly connected to the stator core 41 the compound pinion 28 will process and rotate in the opposite direction of rotor motion with a velocity ratio dictated by the stator mesh ratio which is the ration of teeth of the stator ring gear 25 to the number of teeth in mesh with this gear on the compound pinion 28. Compound pinion rotation drives the output ring gear 24 with relative ratio of the output mesh given by the ration of teeth on this compound pinion and the teeth on the output ring gear 24.

The final speed reducer reduction ratio or rotor speed to output ring gear speed is given by the difference between ration of stator mesh to the ratio of the output mesh.

So the key to setting the final speed reducer output is careful selection teeth numbers in the stator and output meshes.

Set as similar as possible stator and output mesh ratios to produce high reduction ratios and set as different as possibly stator and output mesh ratios for low reduction ratios. Furthermore the direction of output motion at the output ring gear 24 is determined in sense by which of the stator mesh or output mesh has the larger ration. For transmissions with higher reduction at the stator mesh than at the output mesh, the resultant motion at the secondary output ring gear is in the same as the direction of motor rotor rotation. Example teeth counts and the resulting output ratio can be seen in TABLE. 2.

Note that to avoid gear interference of gear teeth with involute profiles and with pressure angle of 14.5 degrees, the difference in tooth numbers between the ring gear and pinion should not be less than 15. For teeth with involute gear profiles and with pressure angle of 20 degree the difference in tooth numbers should not be less than 12 to avoid tooth interference. This is not the case with cycloid gear profiles as they effectively have significant addendum modifications.

The device is easily configured to be either a standard rigid servo actuator or a series elastic actuator based on the which connector element is used fixedly connect reducers stator ring gear 25 to the stator core 41. If the direct coupling 62 is included the device will be a rigid servo and if the spring element 33 is used the device will be a series elastic actuator. This means that actuators configured as rigid servos and others configured as series elastic actuators can easily be combined together into the same machine as required without having to manage varying control requirements currently offered when mixing and matching a range of actuators.

For actuators that include the spring element 33 a stator bearing is also included so the stator ring gear 25 is supported to remain rotatably connected to the outer housing 10 and to maintain the mesh alignment of pinion teeth and the stator ring gear despite the stator ring gear being elastically connected to the stator core 10. The stator ring gear bearing 101 allows the stator ring gear 25 to be axially displaced relative to the stator core 41 as the spring element 33 is loaded and unloaded by the load which enables spring operation whilst maintaining correct alignment and centre distance between the stator ring gear and the compound pinion 28.

The low moving part count and simplicity of the device means that machine builders can afford to have one, tens or hundreds of actuators of all sizes all operating under the same automation architecture and control system for an order of magnitude less cost than existing devices.

The inclusion of a series elastic element means the robot can fall or sustain an impact load without being damaged. So robots using it are robust and not as susceptible to expensive damage and repairs which are common in operating under demanding conditions of use and interaction with the real world and people.

The device has a hollow channel axially right through the device which allows for cables, shafts, fluid lines etc. to be routed through the device from end to end which allows ease of creation of complex multi degree of freedom limb devices with multiple actuators. Furthermore this hollow channel allows multiple actuators to be connected to power and control signals and also have these cables, shafts and hoses protected within this hollow central channel instead of having to hang freely outside the limb where they can get pinched, snagged or damaged.

A smaller channel has been created in the inner hub at the upstream end which allows control lines to exit the device through the stator hub or to exit radially into the stators central hollow cavity. This provides cable routing options whilst preventing any cable fouling with components mounted to the stator hub.

The device includes an absolute position sensing transducer which provides joint position feedback during operation. The absolute position sensor can sense the actuator's position after start up without the need for calibration activities such as are needed in systems with increments shaft encoders.

This transducer system includes a novel absolute position sensing method which utilizes dual channel potentiometers that are wrapped around the periphery of the controller board. A passive element for each channel is mounted on the outer housing and each is in contact with one channel which in turn provides two channels of continuous absolute position sensing. An algorithm is used to combine the signals from each channel to calculate the absolute actuator position through the full 360 degree motion range despite each individual channel having deadband and nonlinear responses during some angles of feedback.

The Precession drive 23 may be geometrically unbalanced and hence susceptible to vibration issues if this issue was not solved by the novel provision in this invention for compensation via a counterbalance element incorporated in the offset crank 26. This counterbalance elements positioned diametrically opposite to the crank offset. For the involute type speed reducer this counterbalance is positioned radially and axially in the void that occurs due to the crank offset in between the outer ring gears 24 and 25 and the compound pinion 28 periphery as seen on the left in FIG. 11 and in section C-C on the right. The geometry of this offset counter balance mass is designed such that the resulting position the centroid of the entire precessing rotor mass including the offset crank part, the orbiting deep groove bearing, the circlip 32 and the compound pinion 28 is at the centre of rotation of the rotor 21 and axially central to the offset mass of these listed parts. The positioning of this counter balance mass in the void between the compound pinion 28 and the ring gears 24 and 25 is novel and maximizes transmission compactness.

In the case of the compound cycloid type reducer this counterbalance mass is incorporated into the rotor 26 and is again opposite the crank offset to balance the device. These counterbalances prevent vibration during motion in all directions giving low noise high part life and prevents interference with other devices in contact with this one.

Three Additional embodiments of the compound speed reducer have been invented which are novel the first has been named an external pinion precession drive, the second has been named a hybrid precession drive and the third being named the inline precession drive. Note that although each embodiment shows involute tooth profiles, cycloidal tooth profiles can be substituted and operation as described is still valid.

Figure 7:
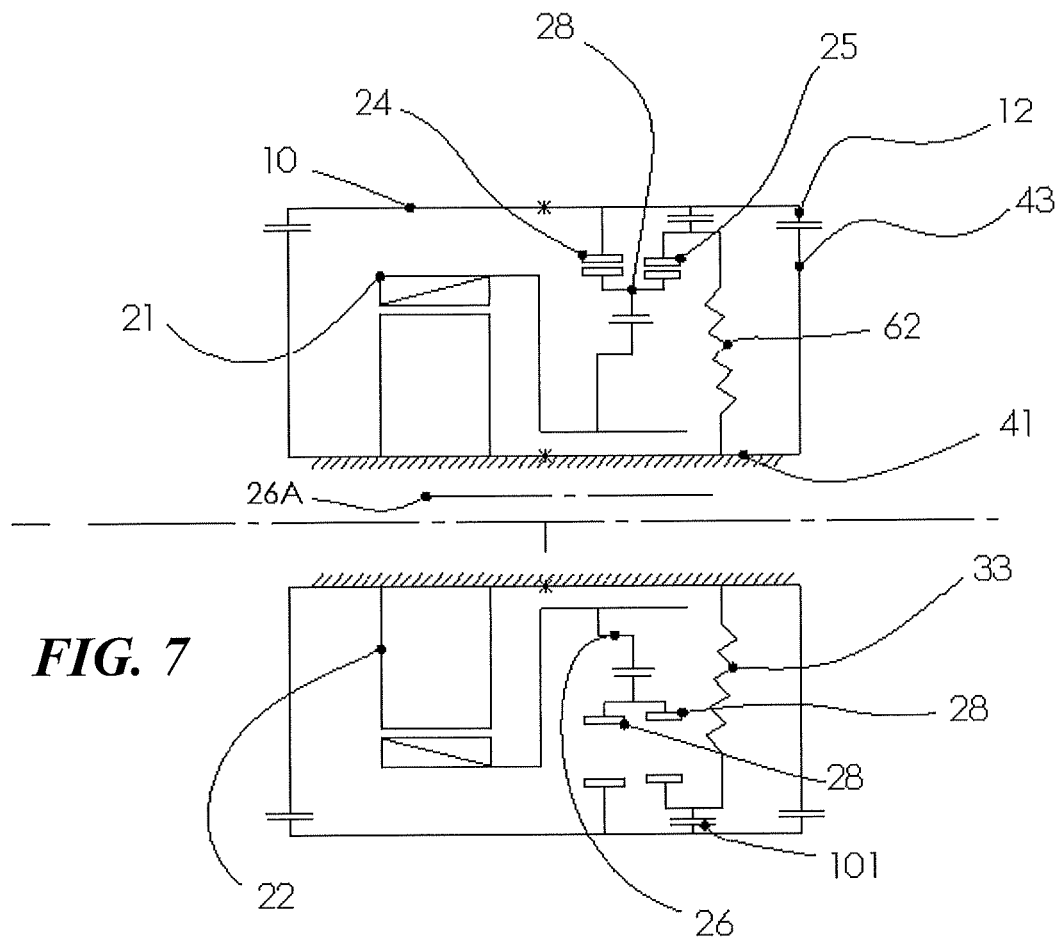
FIG. 7 is a logical symbolic sectional view of an embodiment of the actuator.
Figure 8:
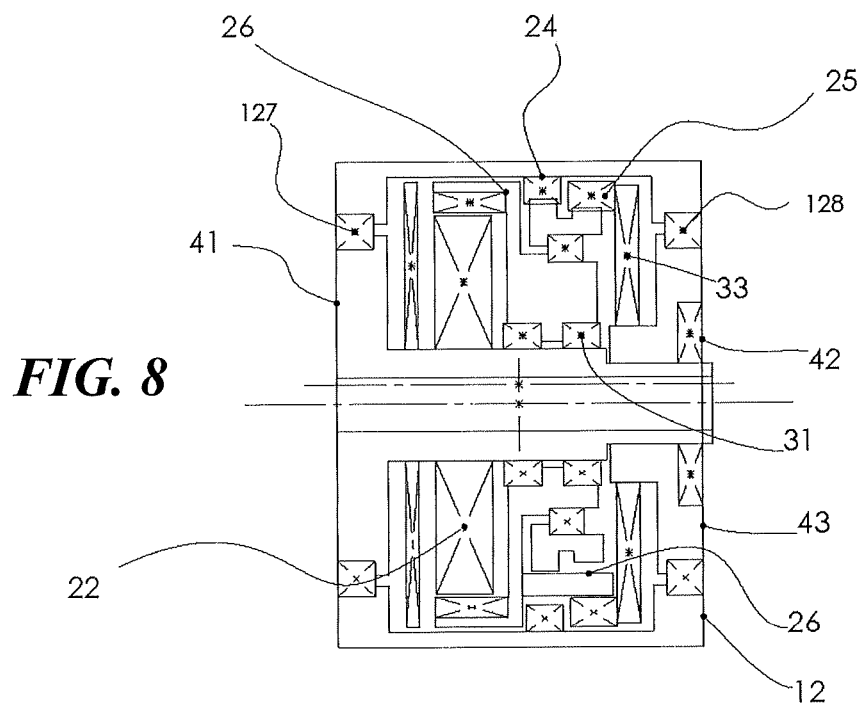
FIG. 8 is a simplified block schematic sectional view provided as a summary of components of an example of an embodiment and their interrelationship.
Figure 9:
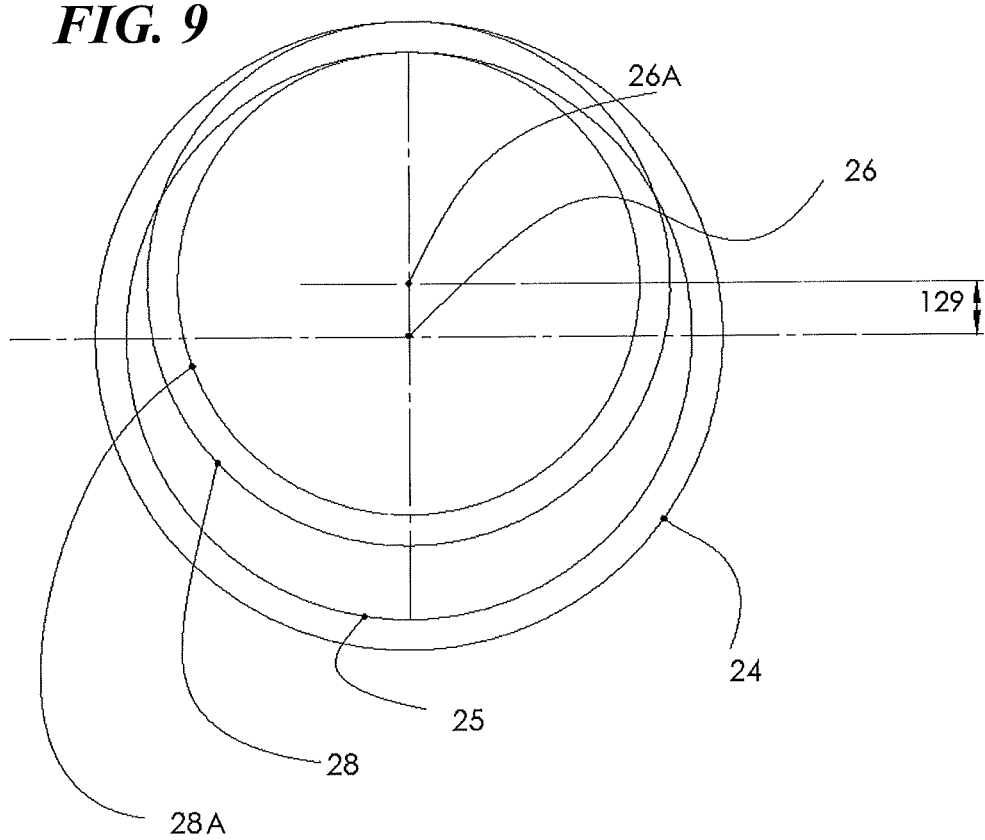
FIG. 9 is a logical symbolic view of one embodiment of the speed reducer gears component of an embodiment.
Figure 10:
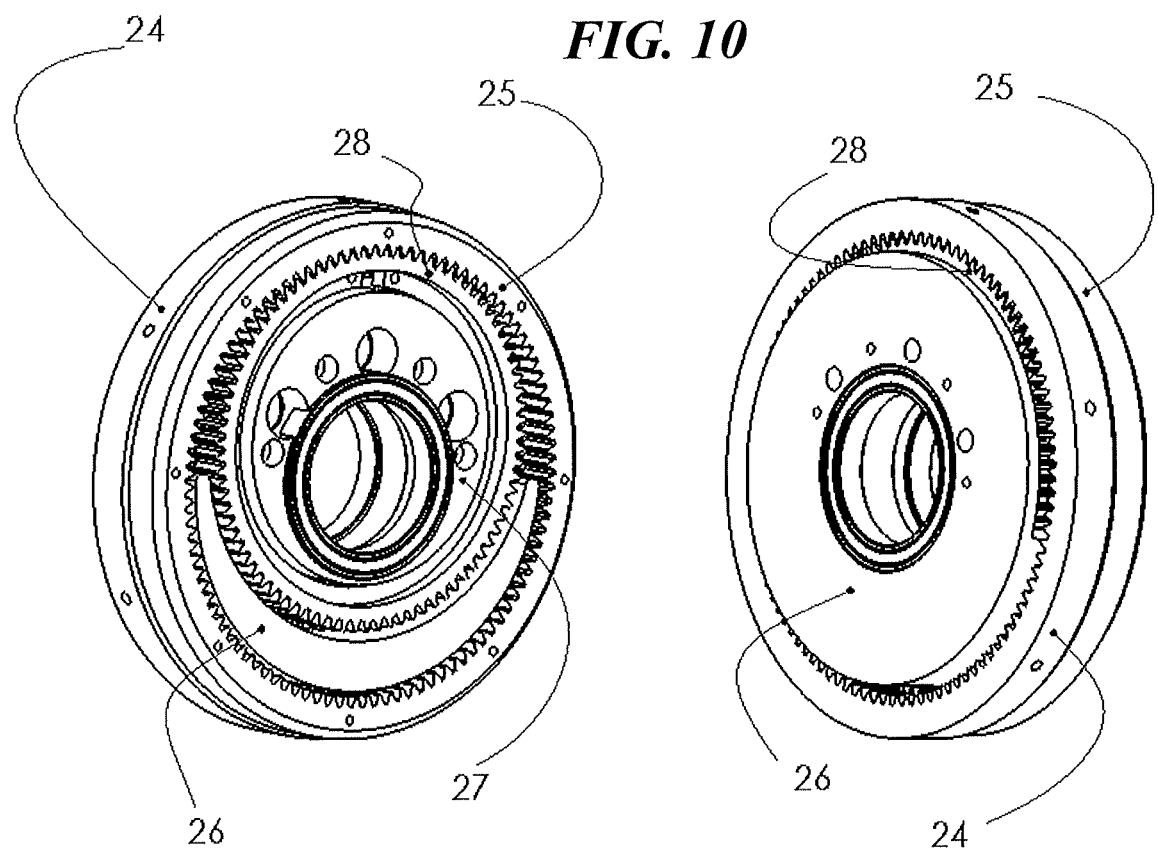
FIG. 10 on the left is a view of the precession drive subassembly as viewed from the downstream side and on the right is the same subassembly as viewed from the upstream side.
Figure 12:
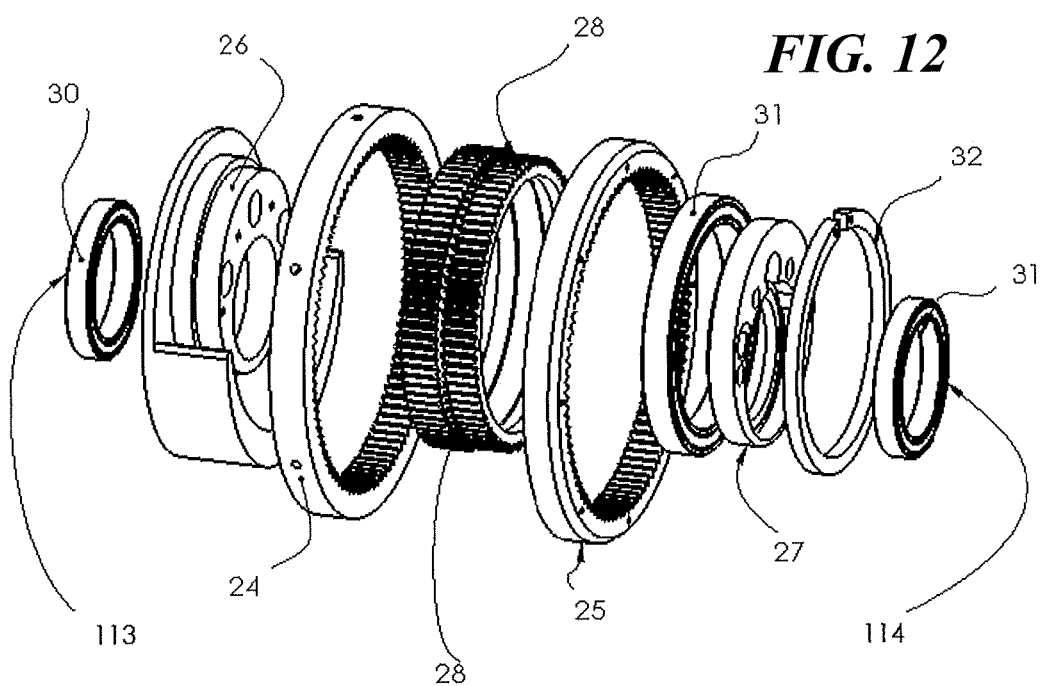
FIG. 12 is an exploded view of the precession drive subassembly to more clearly show the geometry of individual parts from which it is comprised.
Figure 13:
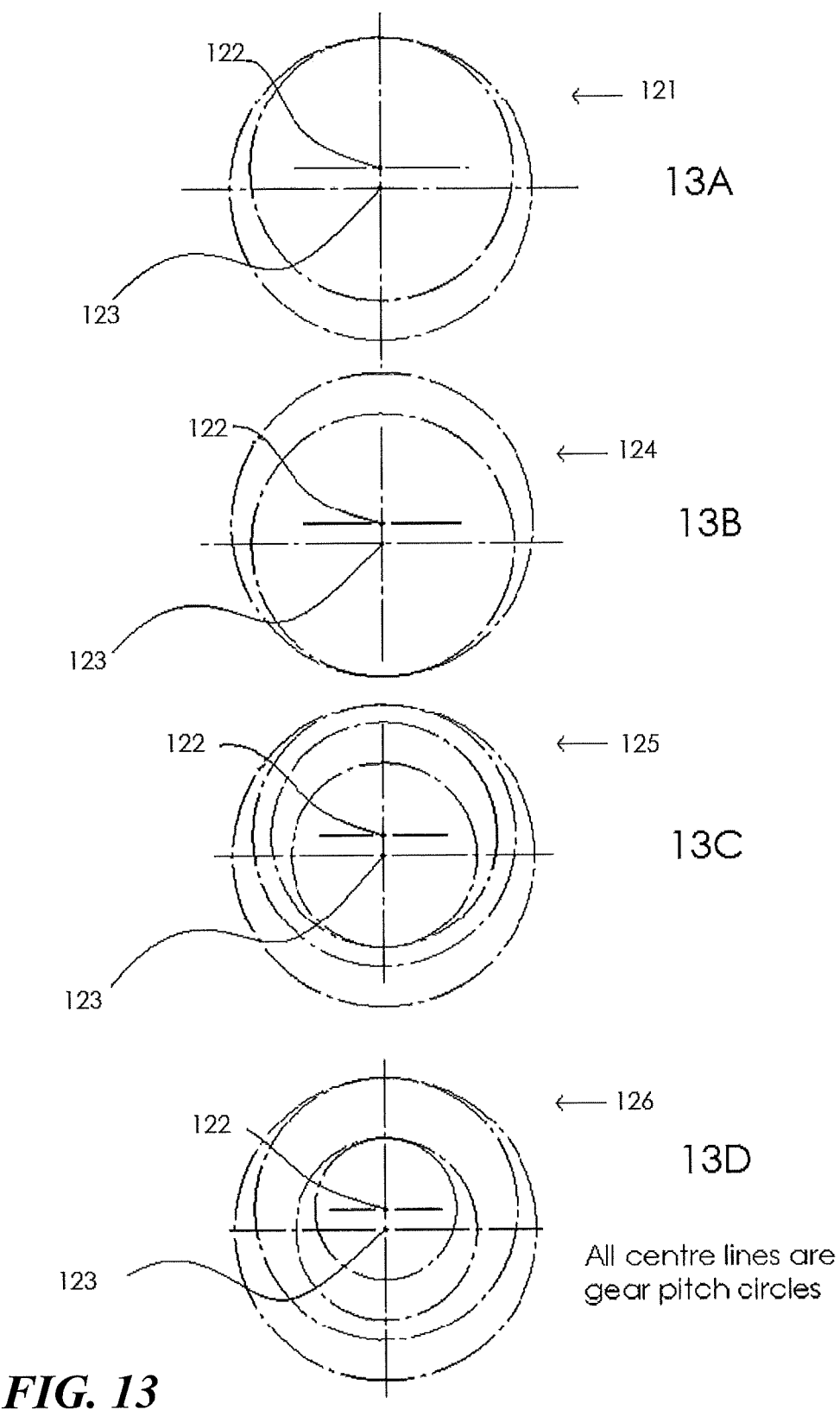
FIG. 13 is a simplified sketch showing 4 embodiments of the Precession drive

FIG. 7 is alogical symbolic sectional view of an embodiment of the actuator. In this logical view key elements are shown including symbols to represent relationships between them. Symbols used are not uncommon when depicting planetary and speed reducer configurations; FIG. 7 illustrates a Logical symbolic sectional view of actuator; FIG. 7 parts are represented by their bounding box or simplified sectional shape for clarity;

FIG. 8 is a simplified sectional view provided as a summary of items and an example of their layout; FIG. 8 illustrates a Simplified View;

FIG. 9 is a logical symbolic view of one embodiment of the speed reducer gears in mesh outlining terminology; FIG. 9 illustrates a Logical symbolic view of speed reducer gears in mesh outlining terminology; FIG. 9 circles represent the pitch circle of gears in mesh;

FIG. 10 on the left is a view of the precession drive subassembly as viewed from the downstream side and on the right is the same subassembly as viewed from the upstream side; FIG. 10 illustrates a Balanced involute-type speed reducer (Precession drive) assembly as viewed from the downstream on the left and upstream sides on the right;

FIG. 11 on the left shows the precession drive subassembly viewed from the downstream side and on the right shows a section view C-C of the subassembly shown on the left to reveal the part geometry, inter-relatedness and organization. The counterbalance mass that balances the eccentricity caused by the offset crank is labelled and sits between the pinion and ring gears; FIG. 11 illustrates a Front and section C-C view of balanced compound involute-type speed reducer;

FIG. 12 is an exploded view of the precession drive subassembly to more clearly show the geometry of individual parts from which it is comprised; FIG. 12 illustrates an Exploded view of the balanced involute type speed reducer (precession drive) subassembly;

FIG. 13 is a simplified sketch showing four novel embodiments of the Precession drive presented here. View a) shows the standard configuration in which pinion gear pitch circles are internal to the pitch circles of the ring gears. View b) shows the external pinion configuration in which pinion gear pitch circles are external to the pitch circles of the ring gears. View c) shows the hybrid pinion configuration in which one pinion gear pitch circle is inside a ring gear and the other pinion gear pitch circle is outside a ring gear. View d) shows the inline pinion configuration of FIG. 19 in which both pinion gear pitch circles are internal to their corresponding ring gear pitch circles however one pinion gear pitch circle is located axially inline and radially within the other pinion gear pitch circle.

FIG. 13 is a simplified sketch showing 3 variations of speed reducer assembly. The top view shows the standard configuration in which the pinion pitch circle is internal to the stator pitch circle and output ring gears, the middle view shows a configuration wherein the pinion pitch circle is external to the stator and output ring gear pitch circle and the bottom view shows a configuration wherein the pinion pitch circle is in between the stator ring gear and the output ring gear pitch circles; FIG. 13 illustrates Three variations showing embodiments of the precession drive and its versatility in function with the first FIG. 13A at the top showing the embodiment of FIG. 1, the second in the middle FIG. 13B showing the precession drive configured such that the pinion orbits an internal primary and secondary the ring gear and the third FIG. 13C at the bottom showing a pinion set to precess in mesh with the primary ring gear external to it and the secondary ring gear internal to it;

Second Embodiment

Figure 14:
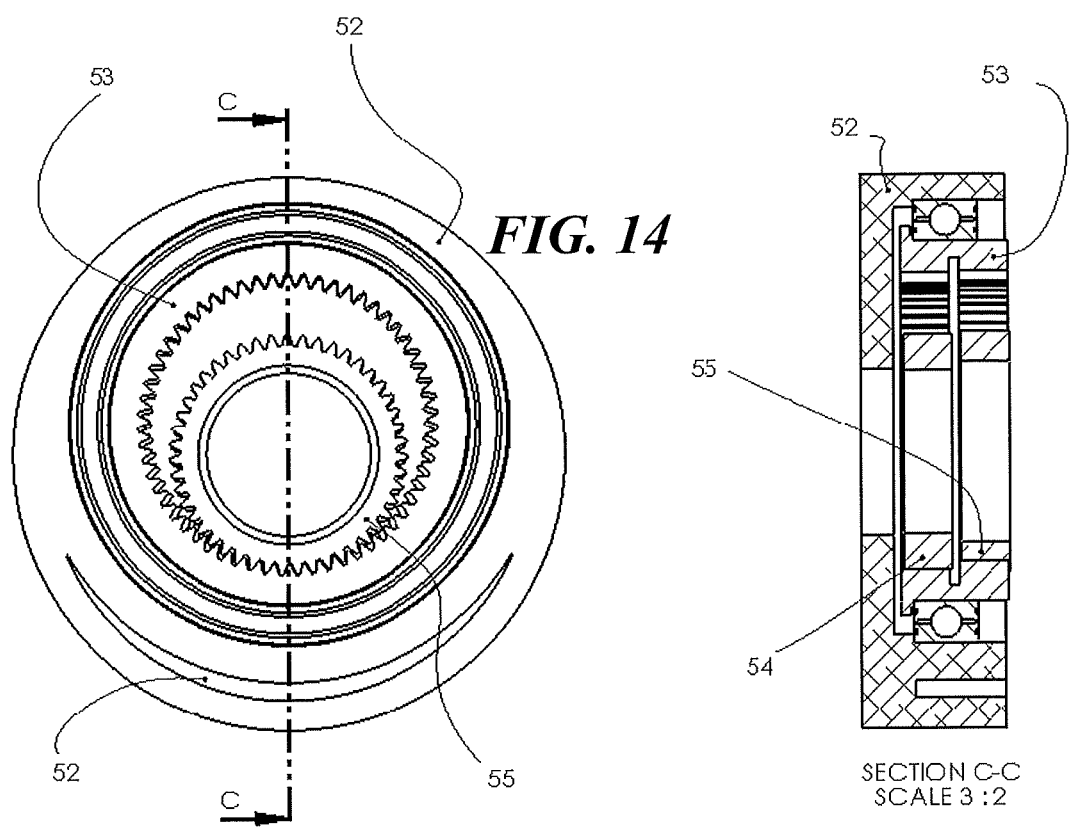
FIG. 14 is a front view on the left and section view C-C on the right of an embodiment of the external pinion compound involute speed reducer.
Figure 15:
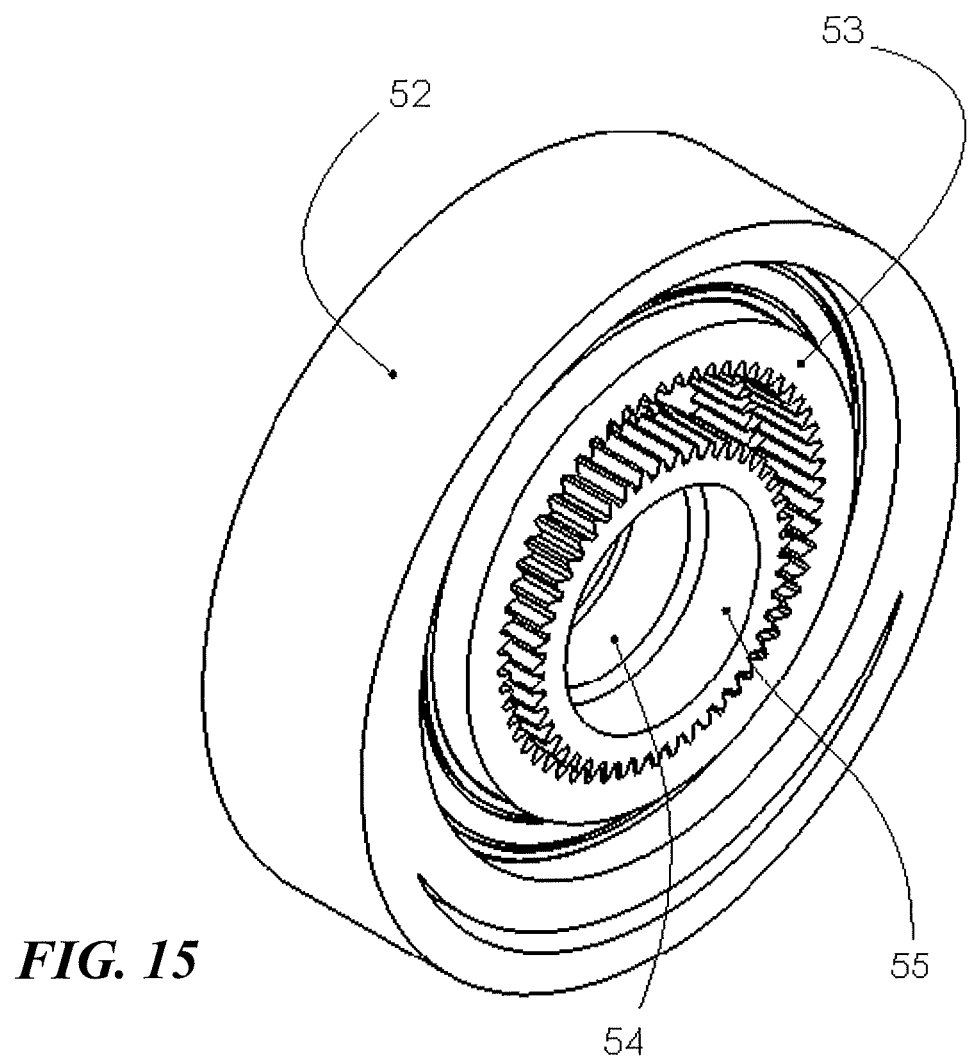
FIG. 15 is an isometric view of the external pinion compound involute speed reducer of FIG. 14.

A second embodiment of a balanced compound involute type speed reducer named here as an external pinion precession drive the present invention is illustrated in FIG. 14 and FIG. 15.

FIG. 14 is a front view on the left and section view C-C on the right of the external pinion compound involute speed reducer. In this configuration the pinion is external to the stator and output ring gears. A void is indicated which allows the offset crank mass eccentricity to balance the pinion mass eccentricity so the assembly is balanced; FIG. 14 illustrates a Front and section view C-C of external pinion precession drive subassembly;

FIG. 15 is an isometric view of the external pinion compound involute speed reducer; FIG. 15 illustrates an Isometric view of the external pinion compound involute speed reducer;

In this embodiment the rotor with offset crank 52 is radially external to the compound pinion 53, stator ring gear 54 and output ring gear 55. A bearing is fixedly connected to the rotor with an eccentricity. The compound pinion 53 is fixedly mounted to the inner bearing half and hence also is eccentric to the rotation axis of the rotor 52. The eccentricity holds the teeth of the compound pinion in mesh with those of the stator ring gear 54 and output ring gear 55 on one side and the teeth out of mesh on the opposite side. As the rotor rotates the compound pinion 53 precesses around the periphery of the stator ring gear 54 causing it to rotate in the opposite direction to rotor motion. The precessing and rotating compound pinion hence drives the output ring gear in which it is also in mesh on one side. This embodiment is in essence an involute type speed reducer turned inside out. A counterbalance void can be included into the rotor as shown-in FIG. 14 to balance the transmissions rotating parts radially and axially to reduce vibrations whilst in operation. The external pinion precession drive can be incorporated into the robot muscle actuator as required to suit system requirements.

Third Embodiment

Figure 16:
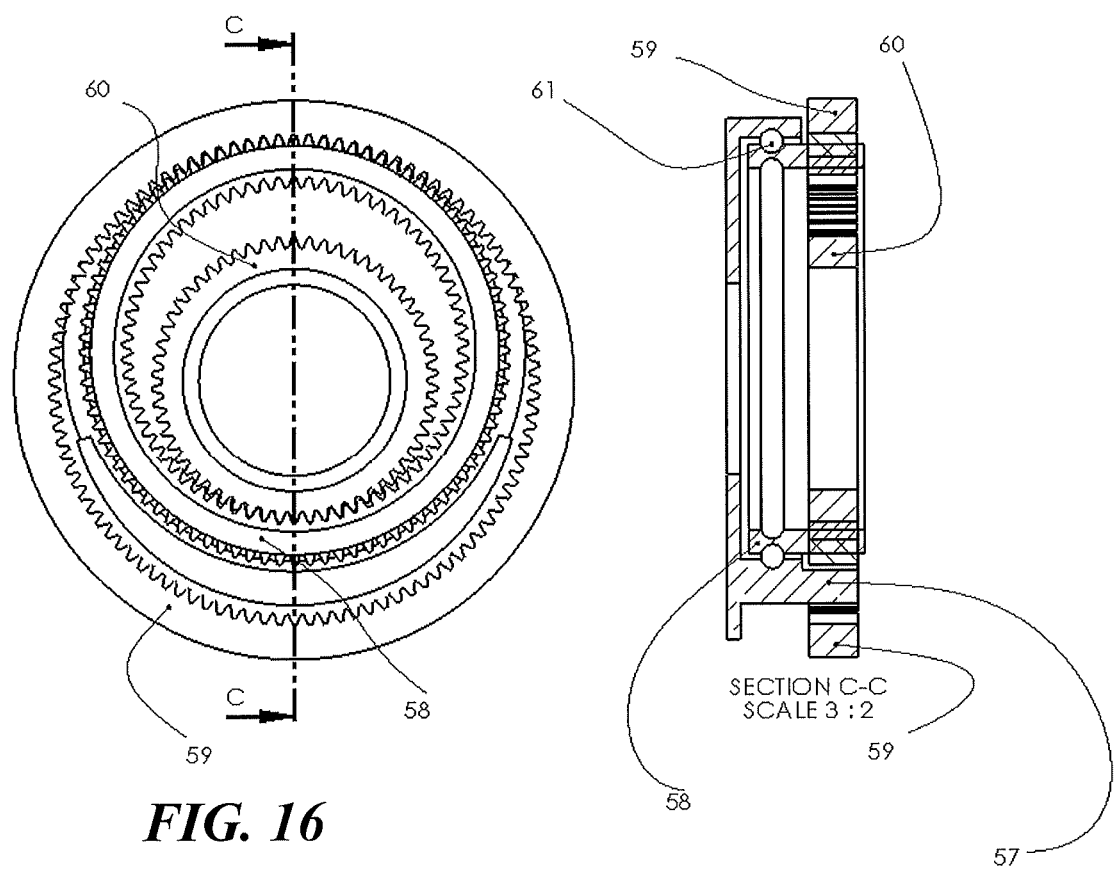
FIG. 16 is a front view on the left and section view C-C on the right of an embodiment of the hybrid compound involute type speed reducer.
Figure 17:
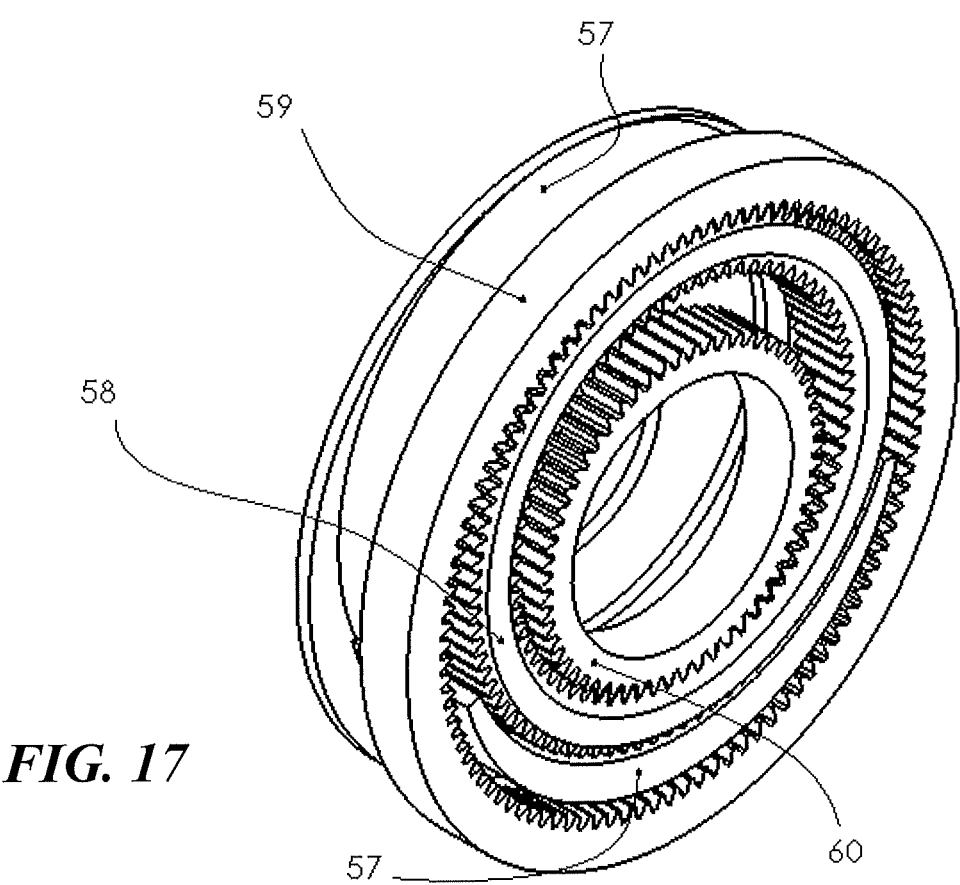
FIG. 17 is a 3D view of the hybrid compound involute type speed reducer of FIG. 16.

A third embodiment of a the compound involute type speed reducer named here a hybrid precession drive of the present invention is novel and is illustrated in FIG. 16 and FIG. 17.

FIG. 16 is a front view on the left and section view C-C on the right of the hybrid compound involute type speed reducer. In this configuration the pinion is between the stator ring gear and the output ring gear; FIG. 16 illustrates a Front and section view C-C of hybrid compound involute type speed reducer (hybrid precession) subassembly. Ring gears and pinion are all in the same plane; FIG. 16 ring gears and pinion are all in the same plane;

FIG. 17 is a 3D view of the hybrid compound involute type speed reducer. Counterbalance is part of the offset crank as indicated and is positioned between outer, output ring gear and the inner stator ring gear to balance the eccentricity of the precessing pinion; FIG. 17 illustrates a 3D view of the hybrid compound involute type speed reducer;

In this embodiment the compound pinion 58 is positioned radially internal to the output ring gear 59 and radially external to the stator ring gear 60. The compound pinion has the primary row of teeth on its inner surface jutting inwards and has the secondary row of teeth on its outer surface jutting outwards. A rotor with offset crank 57 is rotatably connected via a pinion bearing 61 to the compound pinion 58. The pinion bearing 61 allows the compound pinion to rotate freely about an access eccentric to the rotor axis. This eccentricity holds the primary compound pinion inner teeth in mesh with the teeth of the stator ring gear 60 on one side and holds the teeth out of mesh on the opposite side. The eccentricity also holds the secondary compound pinion teeth on the pinions outer surface in mesh with the teeth on the output ring gear 59 on one side and holds them out of mesh on the opposite side. As the rotor rotates about its axis the compound pinion is caused to precess around the periphery of the stator ring gear 60 and rotate in the direction of rotor rotation. Pinion rotation causes the output ring gear 59 to rotate in the direction of rotor rotation with ratio set by the primary and secondary gear meshes. The hybrid precession drive can be incorporated into the robot muscle actuator as required to suit system requirements.

Fourth Embodiment

Figure 18:
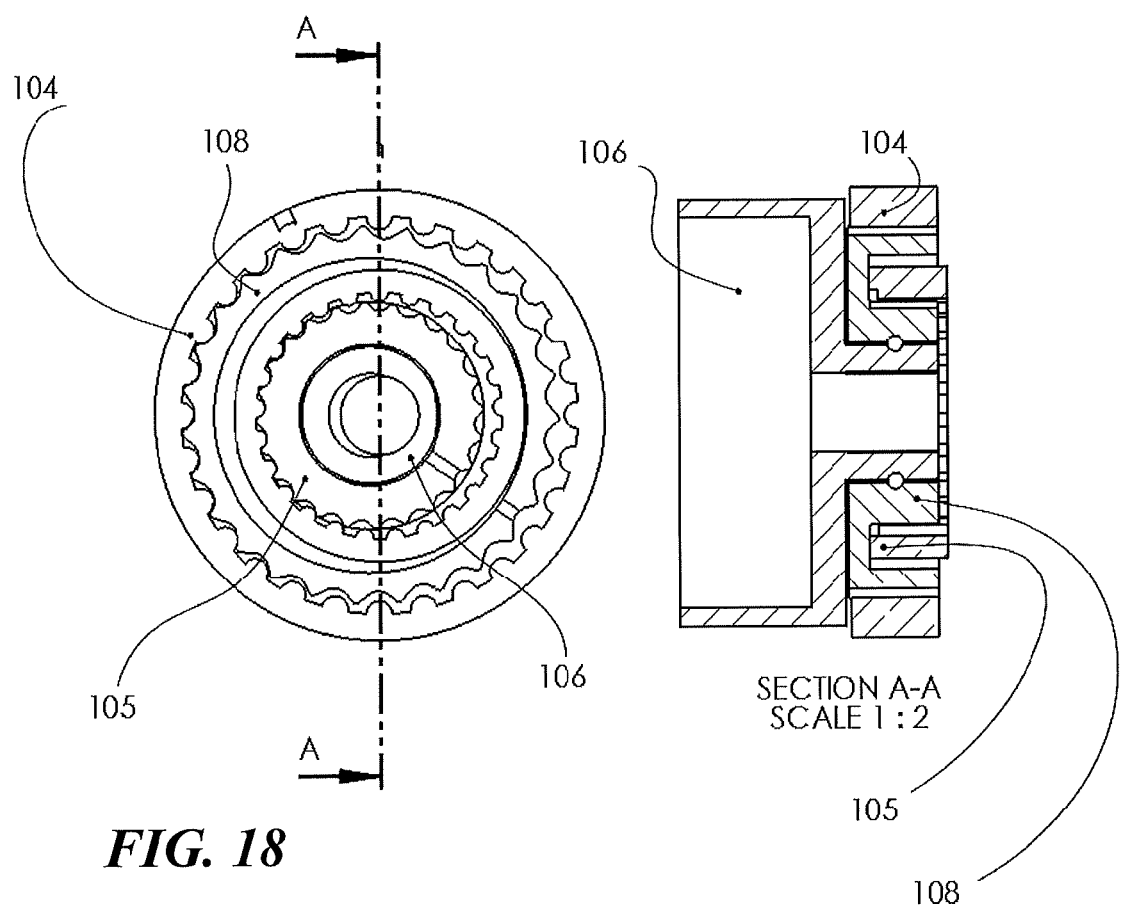
FIG. 18 Front and section view A-A of an embodiment of an inline compound cycloidal reducer FIG. 19 3D view of an inline compound cycloidal reducer of FIG. 18.
Figure 19:
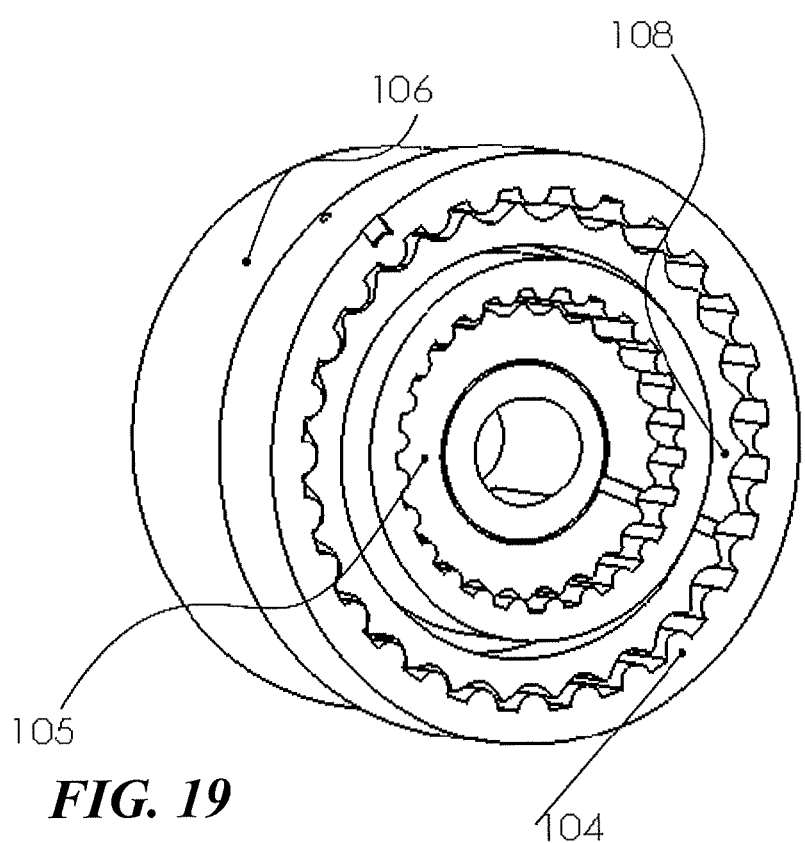

A fourth embodiment of the compound speed reducer is the inline compound cycloidal type speed reducer named here an inline precession drive of the present invention which is novel and is illustrated in FIG. 18 and FIG. 19.

FIG. 18 front and section view A-A of an inline compound cycloidal reducer, the improvement being that the surfaces that teeth protrude from have been placed radially inline to reduce the axial size of the transmission. FIG. 18 illustrates a Front and section view A-A of an inline compound cycloidal reducer;

FIG. 19 3D view of an inline compound cycloidal reducer. FIG. 19 illustrates a 3D view of an inline compound cycloidal reducer;

In this embodiment the compound pinion 108 has been folded so that the surfaces that teeth protrude from have been placed radially inline to reduce the axial size of the transmission. All components function as they do in the compound precession drive.

The gear teeth profiles applicable for the compound speed reducer include but is not limited to involute profiles but can operate with cycloidal, saw tooth and helical gear profiles. For involute type speed reducers optimal gear tooth design for constant velocity, quiet, high torque and power transmission with zero tooth interference is achieved by using involute tooth profiles and obeying internal gear design practices such as utilizing 12 extra teeth on external gears 24 and 25 compared with the meshing pinion gears 28 for a 20 degrees pressure angle profile. And for meshes with a 14-½ degree pressure angle there will be 15 extra teeth on external gears 24 and 25 compared with the meshing pinion gears 28 to avoid gear interference.

The precession drive 23 incorporates ball, roller, journal or cone bearings depending on scale, application and load conditions.

Embodiments of the invention can be manufactured in a range of sizes based on system requirements or the engineering 'preferred size' scaling sequencing to best provide actuator in sizes to suit automation applications from sub miniature to heavy industrial automation servo drives. Hence actuators may vary from 12 mm in diameter and depth or smaller up to 200 mm in diameter or larger depending on demand. There is no limit to the size this device can be scaled up to and it is not unreasonable to expect devices in the order of several meters in diameter and some meters in depth.

Figure 20:
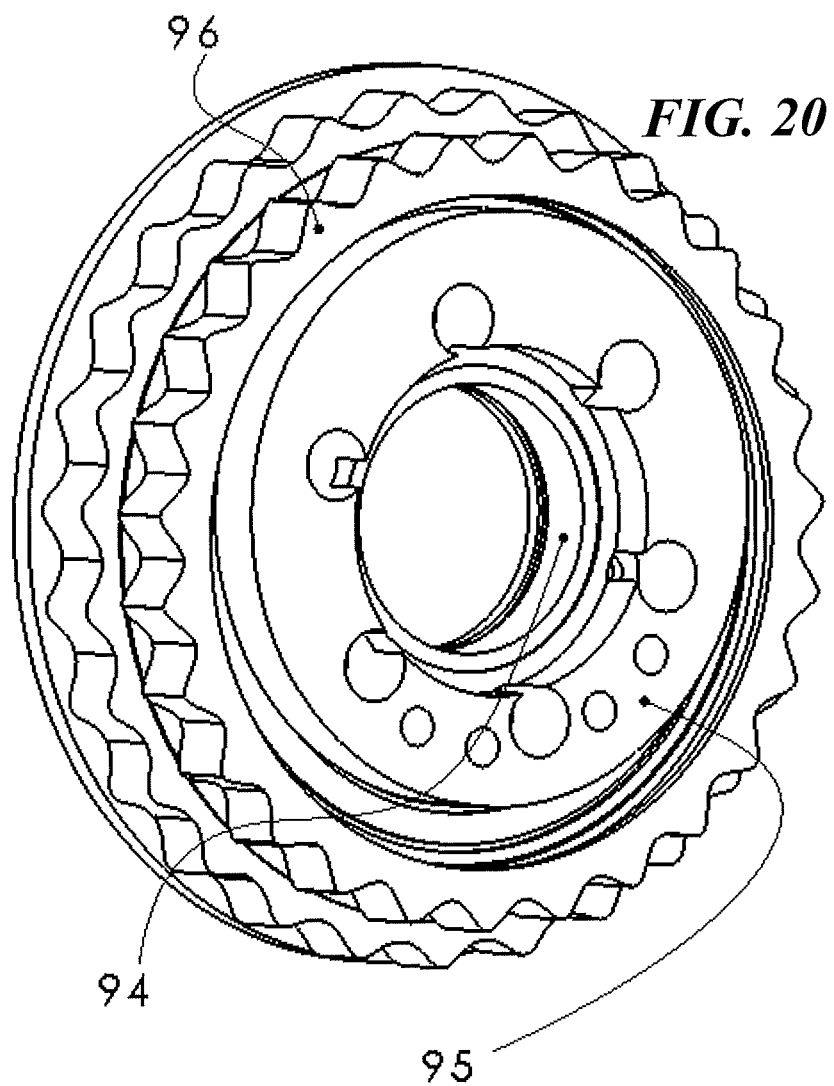
FIG. 20 is a 3D view showing an embodiment of the balanced cycloid type speed reducer compound pinion, bearing retainer and offset crank.
Figure 21:
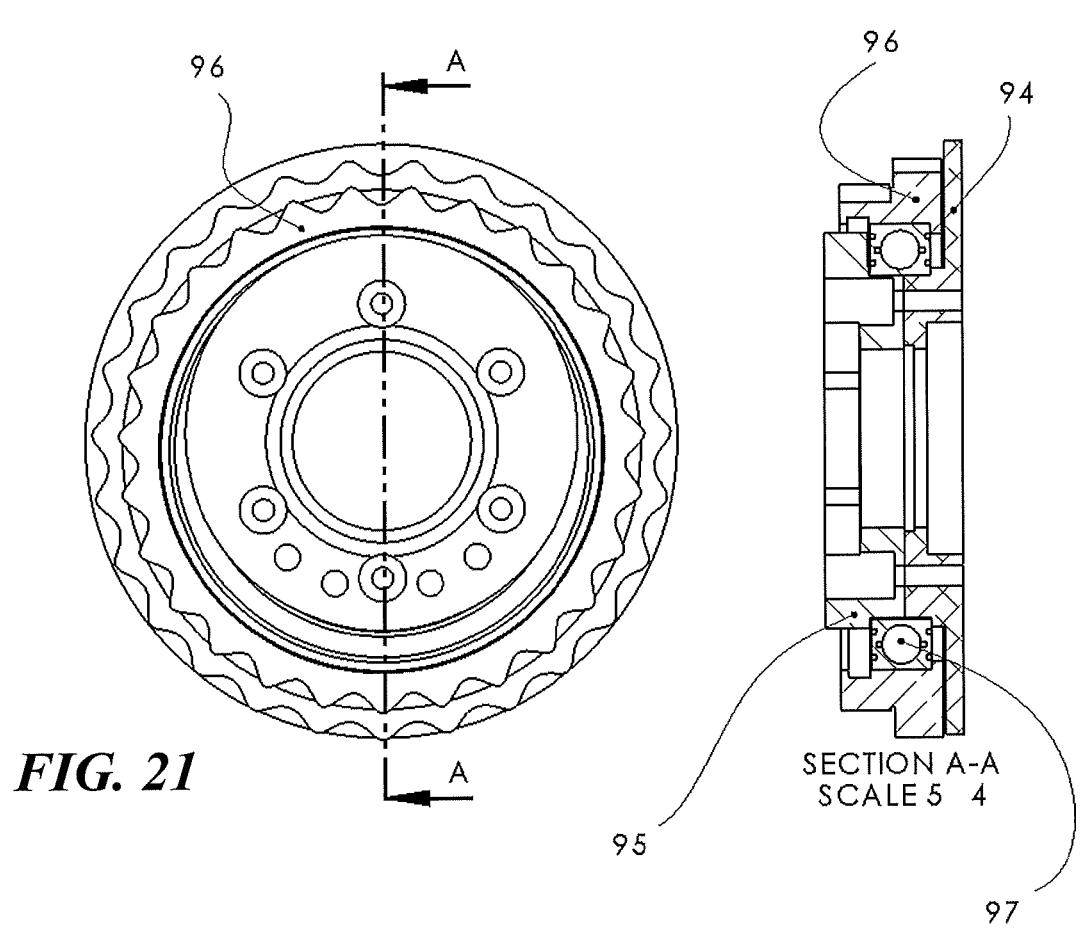
FIG. 21 is a front view on the left and section view A-A on the right showing external and internal details of the balanced cycloid reducer reduction assembly of FIG. 20.
Figure 22:
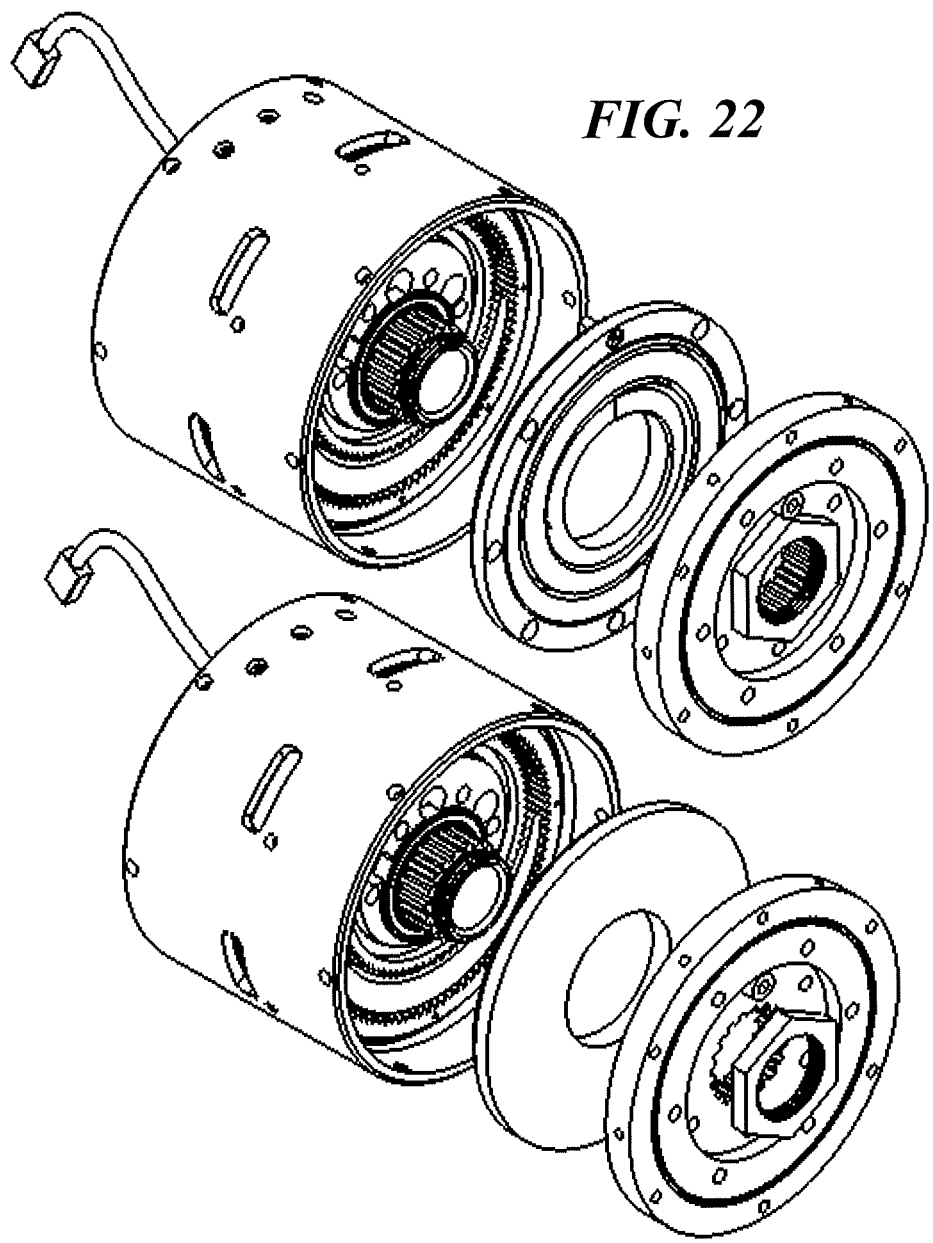
FIG. 22 top view shows an embodiment of the actuator configured to include a spring element which connects the stator ring gear to the stator core thus providing a spring in series with the transmission hence allowing the device to operate as a series elastic actuator.
Figure 23:
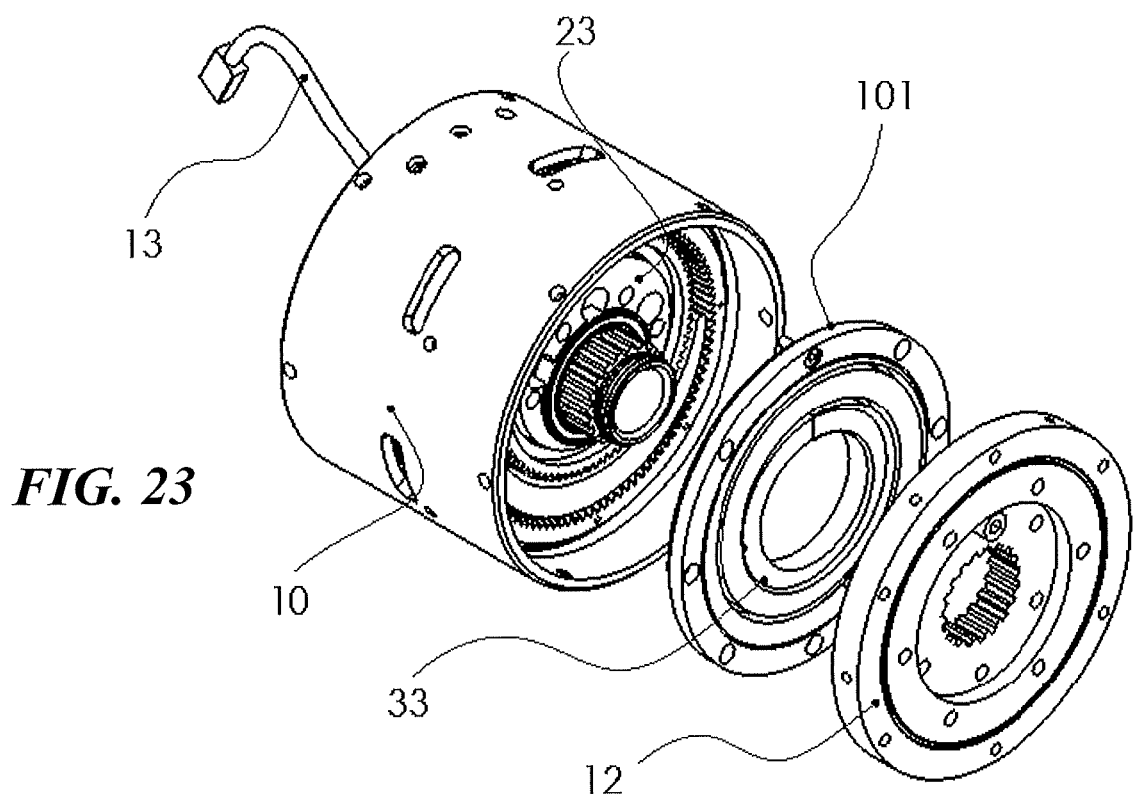
FIG. 23 shows a 3D exploded view of the actuator assembly spring element of FIG. 22.
Figure 24:
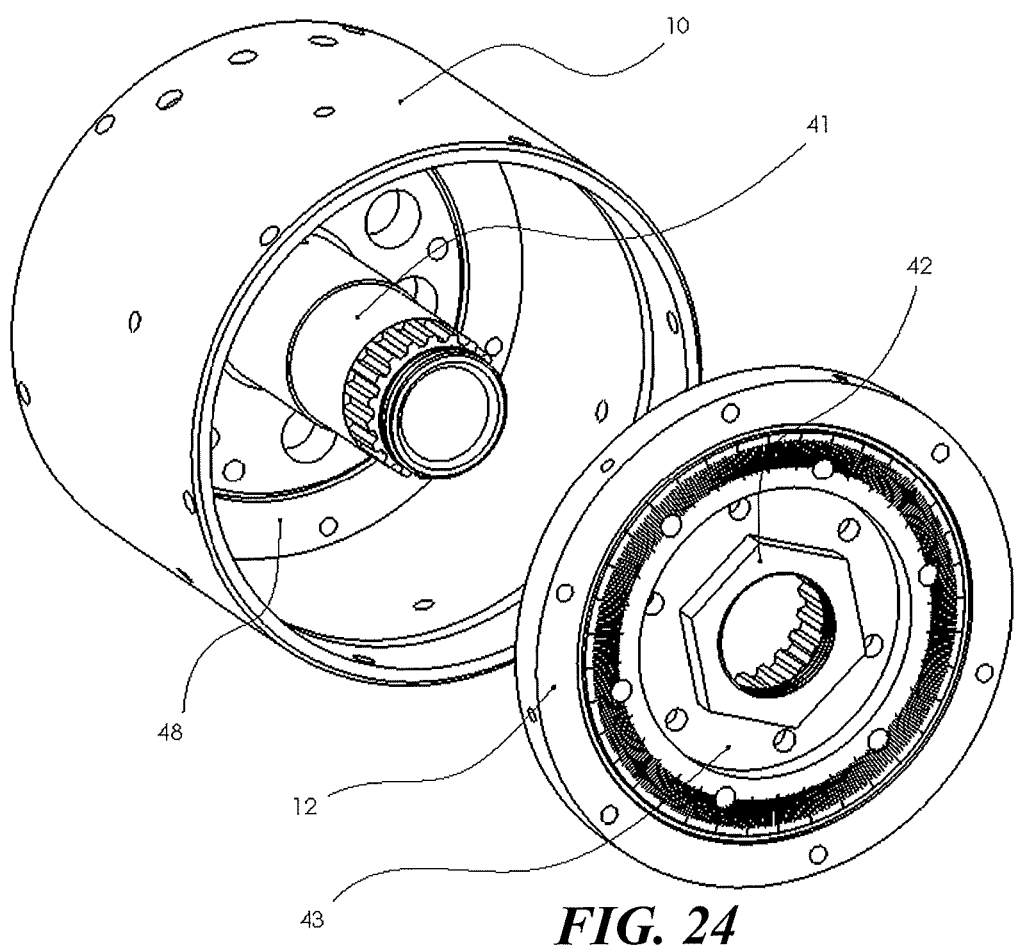
FIG. 24 is a 3D exploded view showing the stator, outer housing, end mounting hubs, optional hub nut and bearings only. In this embodiment there is no drive train components hence this can be used as a freewheeling wheel hub mount.
Figure 25:
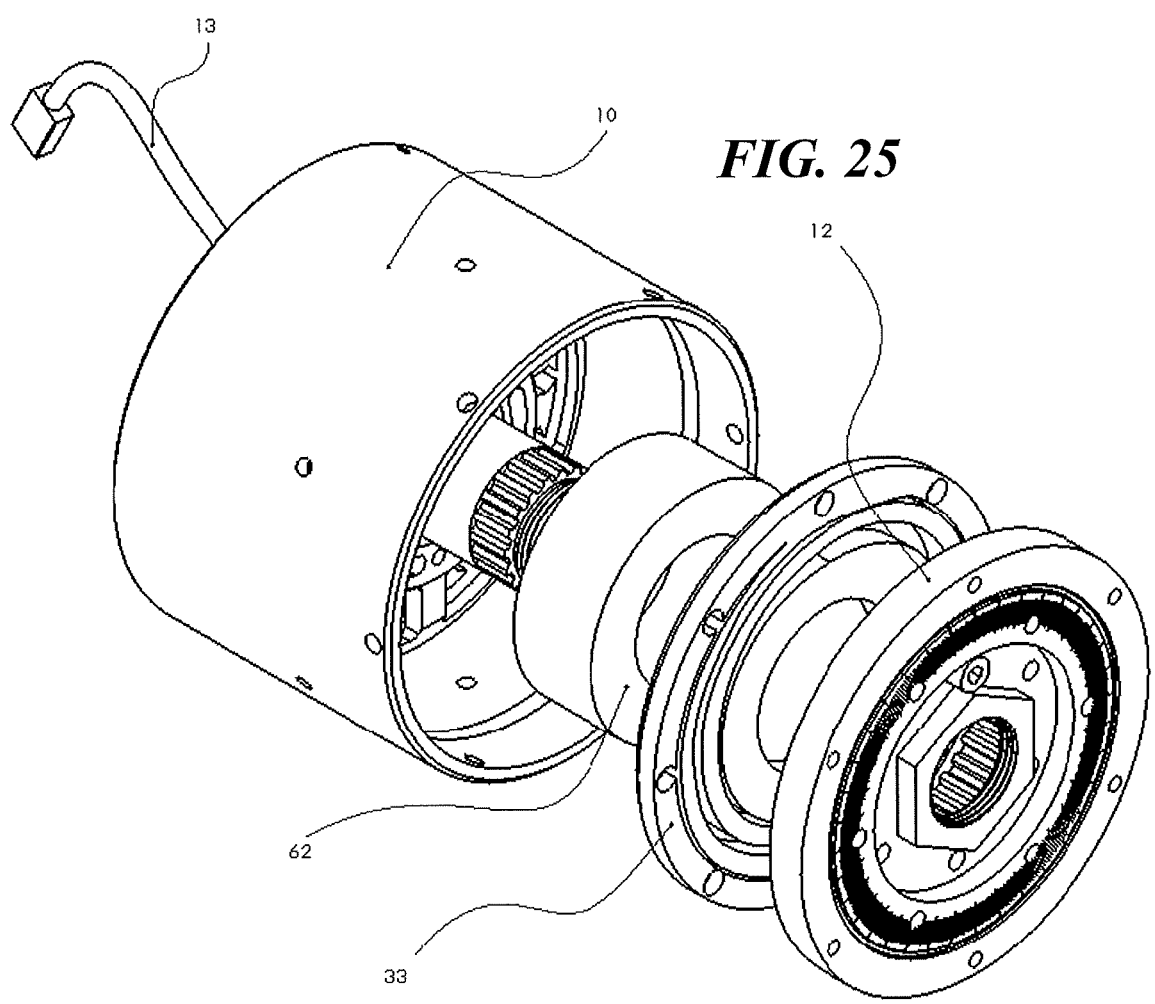
FIG. 25 is an exploded view of the actuator configured for direct 1:1 drive with the speed reducer replaced with direct a drive coupling and series elastic element for compliance.
Figure 26:
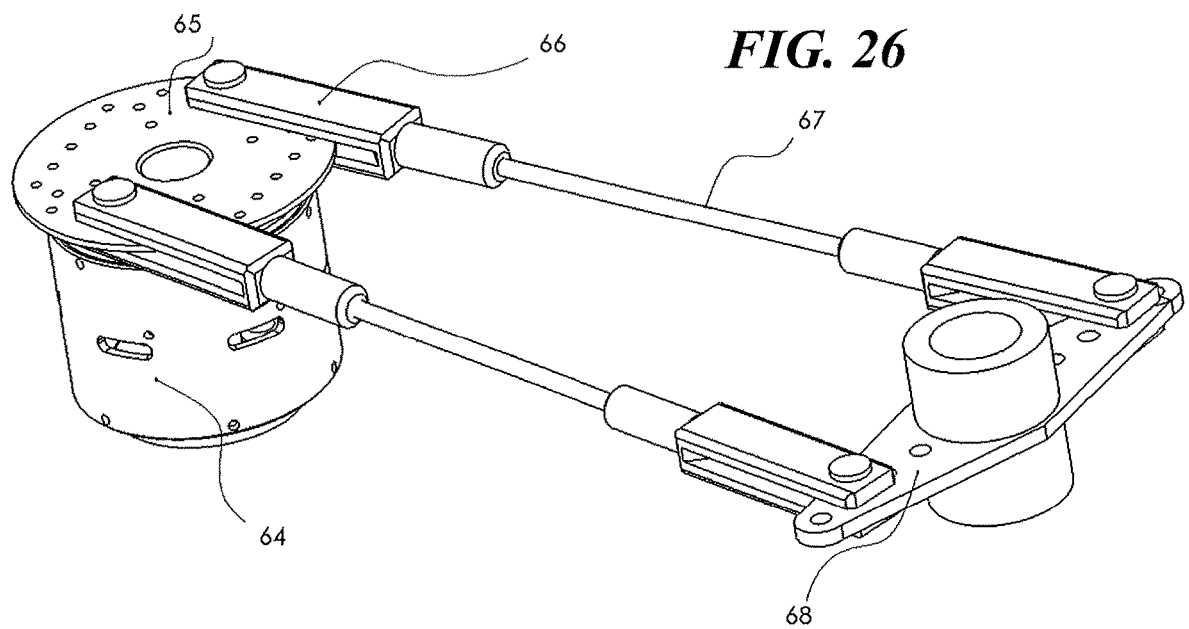
FIG. 26 is a view an application of the robot muscle actuator of FIG. 1 showing how it can be integrated with a control horn, pushrods, clevises and a base mounting plate for operation as a classic radio controlled servo system.
Figure 27:
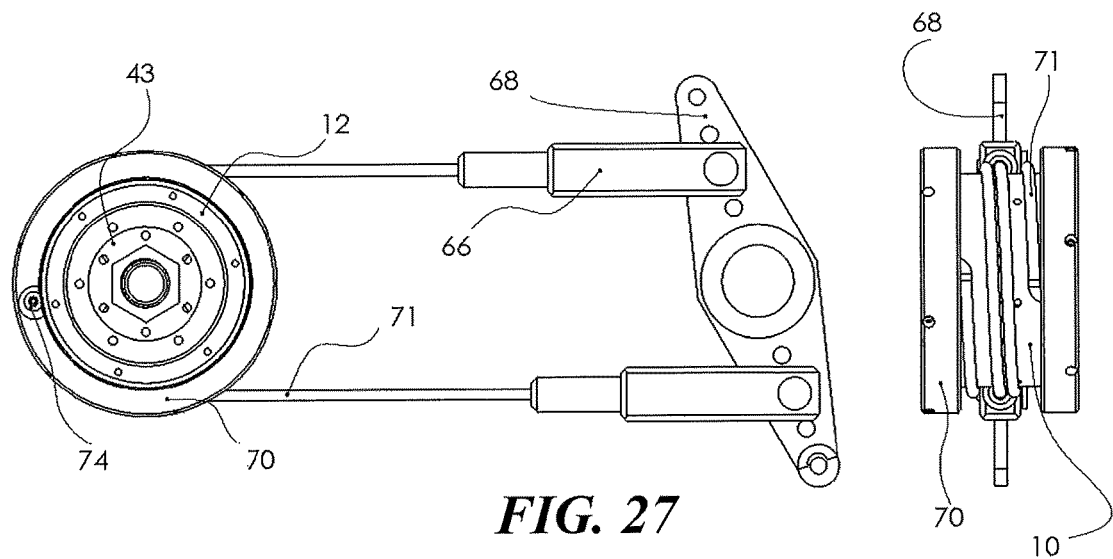
FIG. 27 on the left is a top view and on the right an end view showing an application of the robot muscle actuator of FIG. 1 implemented as a dual tendon capstan drive.
Figure 28:
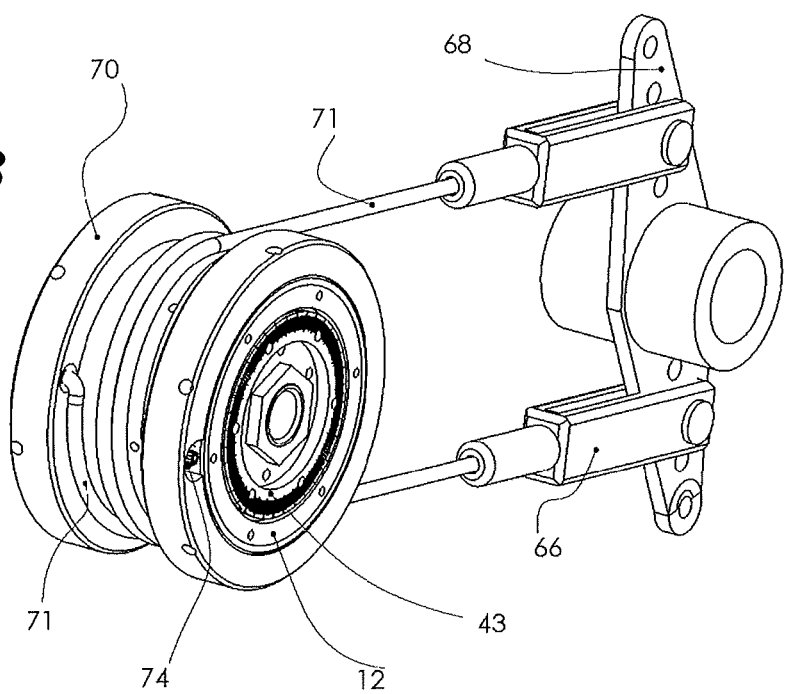
FIG. 28 is a 3D view showing an application of the robot muscle actuator of FIG. 1 implemented as a dual tendon capstan drive.
Figure 29:
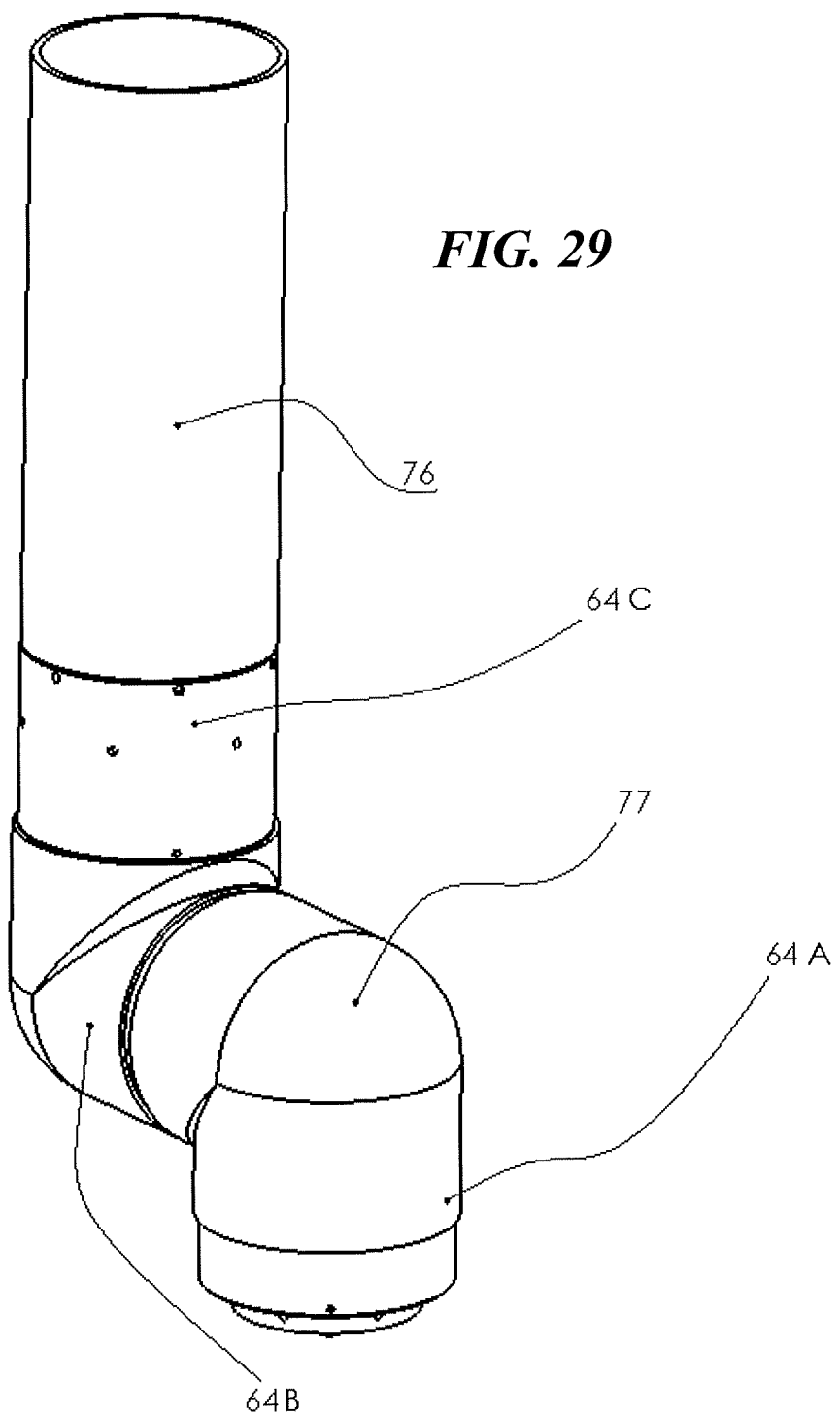
FIG. 29 is a view of three robot muscle actuators from FIG. 1 augmented with additional parts as listed for operation as a three degree of freedom robotic arm elbow configured in such a way that the input and output limbs can fully fold back on themselves.
Figure 31:
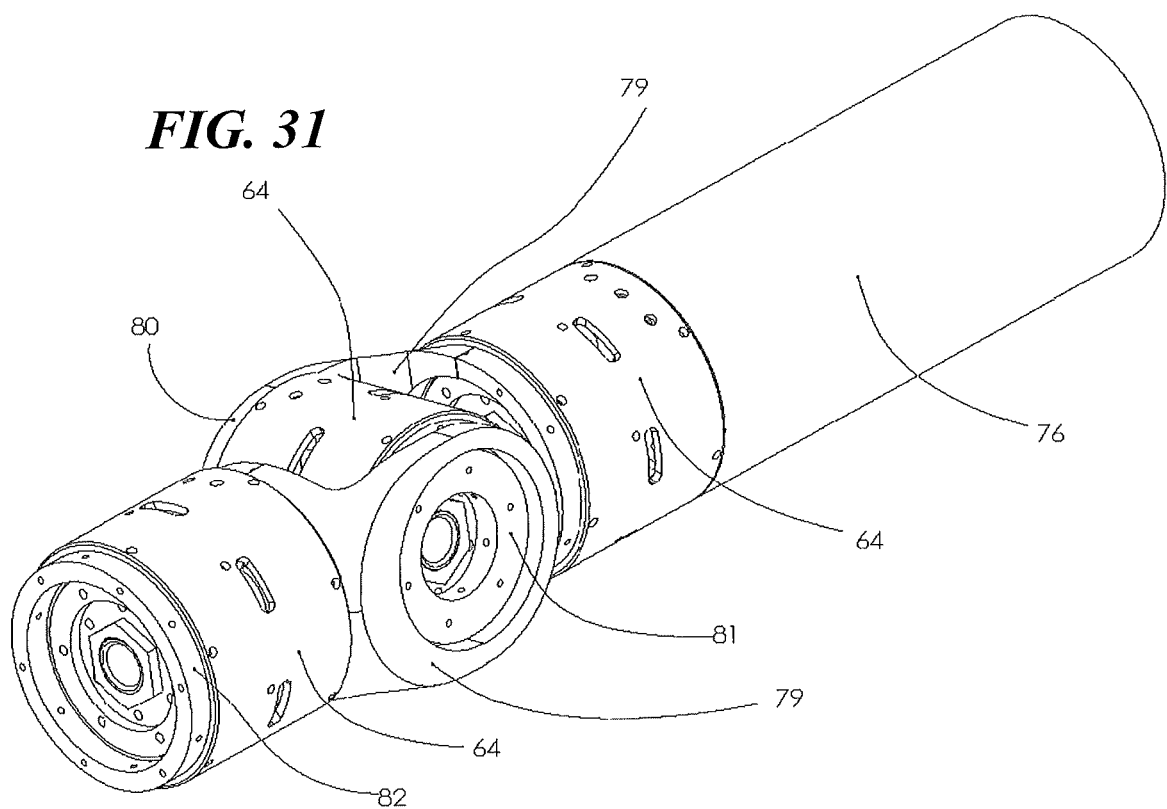
FIG. 31 is a view of three robot muscle actuators of FIG. 1 augmented with additional parts as listed for operation as a three degree of freedom robotic arm elbow configured in such a way that the central axis of each degree of actuation freedom intersects in the joint at a single point for all ranges of motion of all axes.
Figure 32:
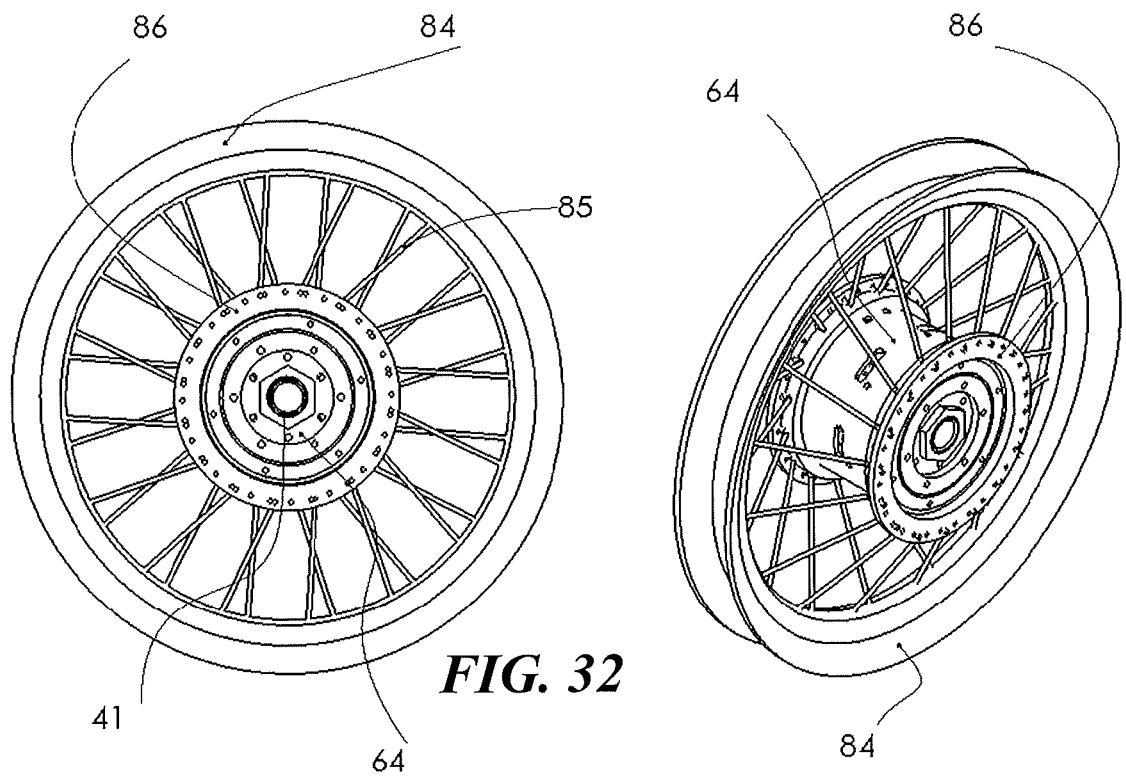
FIG. 32 on the left is a view of an application of the robot muscle actuator from FIG. 1 augmented with additional parts as listed for operation as powered wheel hub motor.
Figure 33:
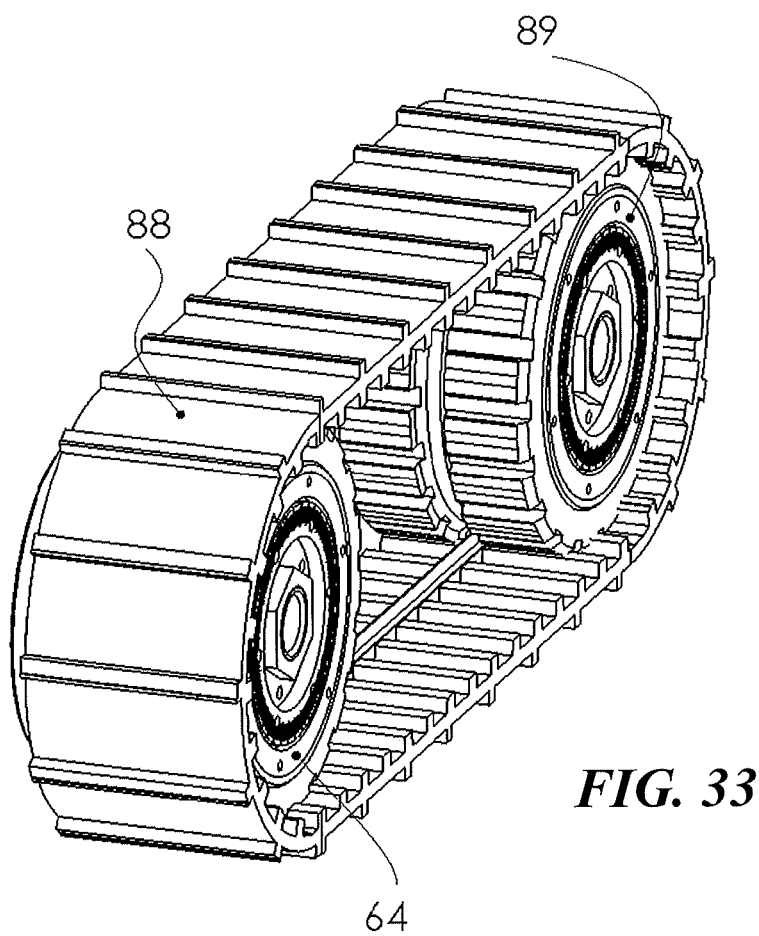
FIG. 33 is a view of an application of a robot muscle actuator as embodied in FIG. 1 implemented as the powered driving actuator hub of a robotic track drive assembly and also a robot muscle actuator assembly configured without motor, controller and drive train for operation as the second passive hub of the same robotic track drive assembly.
Figure 34:
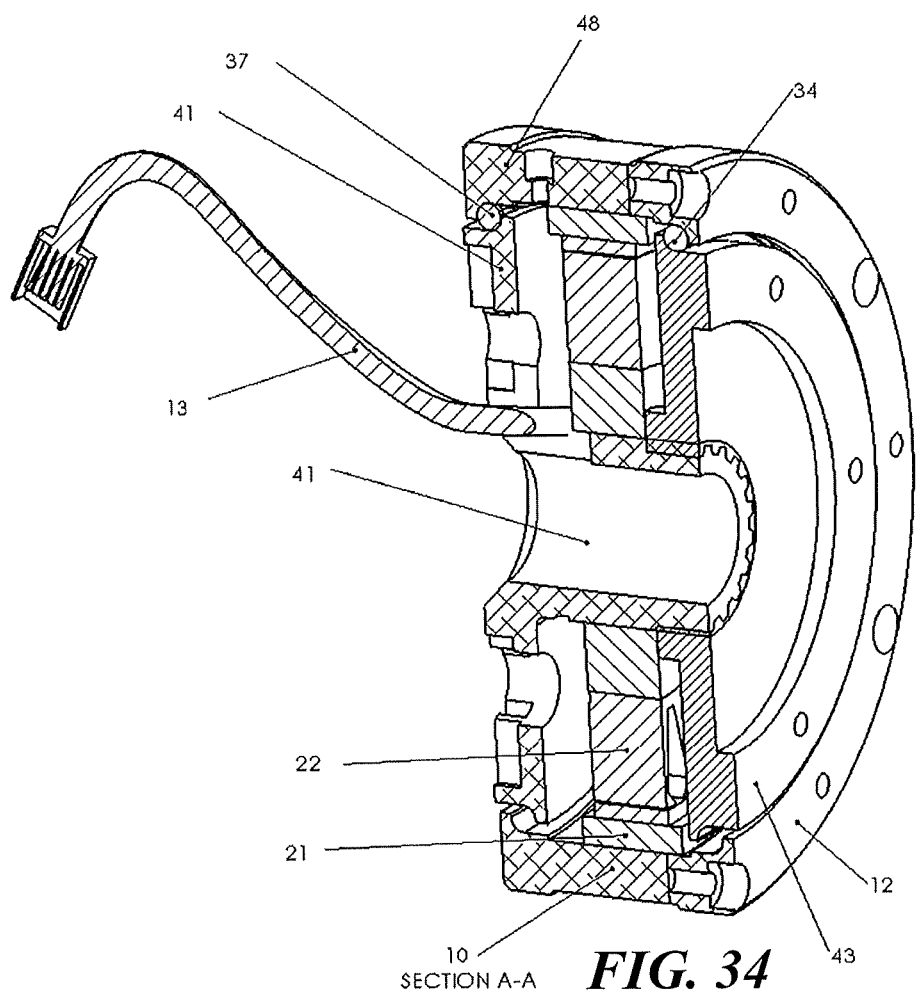
FIG. 34 is a section view of a direct drive electric motor actuator embodiment of a robot actuator.
Figure 35:
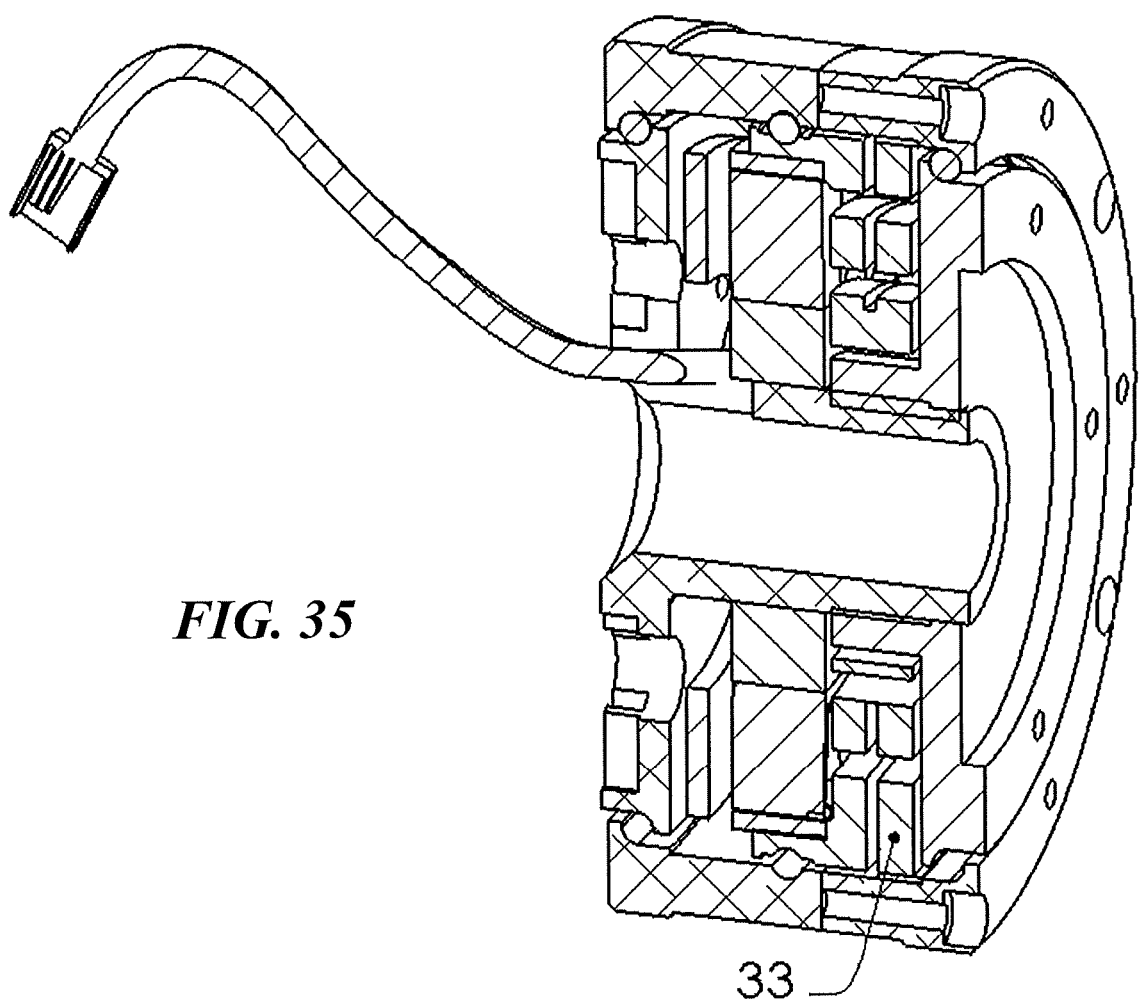
FIG. 35 is a 3D section view of a direct drive robot actuator of FIG. 34 configured with an electric motor actuator with series elastic spring element.

FIG. 20 is a 3D view showing the balanced cycloid type speed reducer compound pinion, bearing retainer and offset crank. The cycloid tooth profile provides for a high reduction high torque transmission option for the robot actuator. The bearing retainer 95 is eccentric to balance the eccentricity of the compound pinion 96; FIG. 20 illustrates a balanced compound Cycloid reducer assembly; FIG. 20 ring gears are omitted for clarity;

FIG. 21 is a front view on the left and section view A-A on the right showing external and internal details of the balanced cycloid reducer reduction assembly including the compound pinion, offset crank, bearing retainer and pinion bearing; FIG. 21 illustrates a balanced compound cycloid reducer assembly front and sectional views;

FIG. 22 top view shows the actuator configured to include spring element 33 which connects the stator ring gear to the stator core thus providing a spring in series with the transmission hence allowing the device to operate as a series elastic actuator;

FIG. 22 bottom view shows the actuator configured with a direct coupling 62 which connects the stator ring gear to the stator core thus providing a rigid transmission; FIG. 22 illustrates Modular components are swappable to suit actuator requirements. Top view shows spring element 33 for series elastic operation and bottom view shows direct coupling 62 for operation as a stiff servo;

FIG. 23 shows a 3D exploded view of the actuator assembly spring element; FIG. 23 illustrates a Robot muscle actuator with series elastic spring element;

FIG. 24 is a 3D exploded view showing the stator, outer housing, end mounting hubs, optional hub nut and bearings only. In this embodiment there is no drive train components hence this can be used as a freewheeling wheel hub mount; FIG. 24 illustrates a Stator, outer housing, end mounting hubs and bearings only;

FIG. 25 is an exploded view of the actuator configured for direct 1:1 drive with the speed reducer replaced with direct a drive coupling and series elastic element for compliance; FIG. 25 illustrates a Direct 1:1 drive with precession drive replaced with direct drive coupling and series elastic element for compliance;

FIG. 26 is a view of the robot muscle actuator of FIG. 1 showing how it can be integrated with a control horn, pushrods, clevises and a base mounting plate for operation as a classic radio controlled servo system; FIG. 26 illustrates a Robot Muscle Actuator fitted with pushrods, clevis rod ends and control horn implemented as a classic radio control servo system;

FIG. 27 on the left is a top view and on the right an end view showing the robot muscle actuator of FIG. 1 implemented as a dual tendon capstan drive. The robot muscle actuator is the master system which drives the remote slave system control horn via an antagonistic cable tendon and clevis rod end pair. The robot muscle inner hub is mated to ground giving actuated output at the robot muscle outer hub and outer housing. The outer housing provides a constant radius driving drum around which both tendon cables are wrapped and which are wound on one side and wound off the other side as the robot muscle outer hub rotates on its axis to draw in and let out cable and hence the rod ends drive the control horn slave system in synchronicity as a slave to the robot muscle master system excitation. The tendons are terminated with cable crimps at the robot muscle actuator end in this example and mate with stepped holes that passes through the capstans rim hub rims. The capstan rim mates with the robot muscle outer hub via bolts into the threaded holes provided at the periphery of the outer housing and outer hub. The excitation torque is hence transferred to cable tension in a distributed fashion blended between static friction between the cable and outer housing and also between the cable termination crimp and the capstan rim hub, the proportions or torque transferred of each depending on the number of turns of cable that wrap the outer housing; FIG. 27 illustrates a Robot muscle implemented as a dual tendon capstan drive;

FIG. 28 is a 3D view showing the robot muscle actuator of FIG. 1 implemented as a dual tendon capstan drive; FIG. 28 illustrates a Robot muscle implemented as a dual tendon capstan drive;

FIG. 29 is a view of three robot muscle actuators from FIG. 1 augmented with additional parts as listed for operation as a three degree of freedom robotic arm elbow configured in such a way that the input and output limbs can fully fold back on themselves; FIG. 29 illustrates Three degree of freedom actuator elbow joint fully collapsable on it's self configuration;

FIG. 30 on the left is the is a view of the robotic arm elbow of FIG. 29 and on the right is sectioned view A-A of the robotic arm elbow of FIG. 29 showing the outer housing, cone bearings, stator and mounting hubs of the robotic muscle actuator of FIG. 1 to show internal details including the device's capability for continuous routing of cables throughout the robotic elbow assembly via the series of adjoining passages made from the stator's hollow centre and hollow limb elbow components; FIG. 30 illustrates a Robot Muscle Actuator elbow section view showing open central passage throughout device for cable routing. Drive train omitted for clarity. Bearings, mounting hubs, example loom and outer housing only are shown in this view; FIG. 30 bearings, mounting hubs, example loom and outer housing only are shown in this view;

FIG. 31 is a view of three robot muscle actuators from FIG. 1 augmented with additional parts as listed for operation as a three degree of freedom robotic arm elbow configured in such a way that the central axis of each degree of actuation freedom intersects in the joint at a single point for all ranges of motion of all axes; FIG. 31 illustrates a Single, double or triple degree of freedom actuator joint; FIG. 31 note that similar configurations can be constructed with two or one robot actuator and degree of freedom if that is the requirement;

FIG. 32 on the left is a view of the robot muscle actuator from FIG. 1 augmented with additional parts as listed for operation as powered wheel hub motor and on the right is a view of the same robot muscle actuator on the left included here for additional clarity; FIG. 32 illustrates an Electric Vehicle wheel hub drive;

FIG. 33 is a view of a robot muscle actuator as embodied in FIG. 1 implemented as the powered driving actuator hub of a robotic track drive assembly and also a robot muscle actuator assembly configured without motor, controller and drive train for operation as the second passive hub of the same robotic track drive assembly; FIG. 33 illustrates a Track hub drive actuator configuration;

FIG. 34 is a section view of a direct drive electric motor actuator embodiment of a robot actuator;

FIG. 35 is a 3D section view of a direct drive robot actuator configured with an electric motor actuator with series elastic spring element 33 and optional controller board. This actuator can also be configured without the control board;

Note that the hybrid involute precession drive reduction ratios do not necessarily conform to those represented in TABLE. 2.

Figure 36:
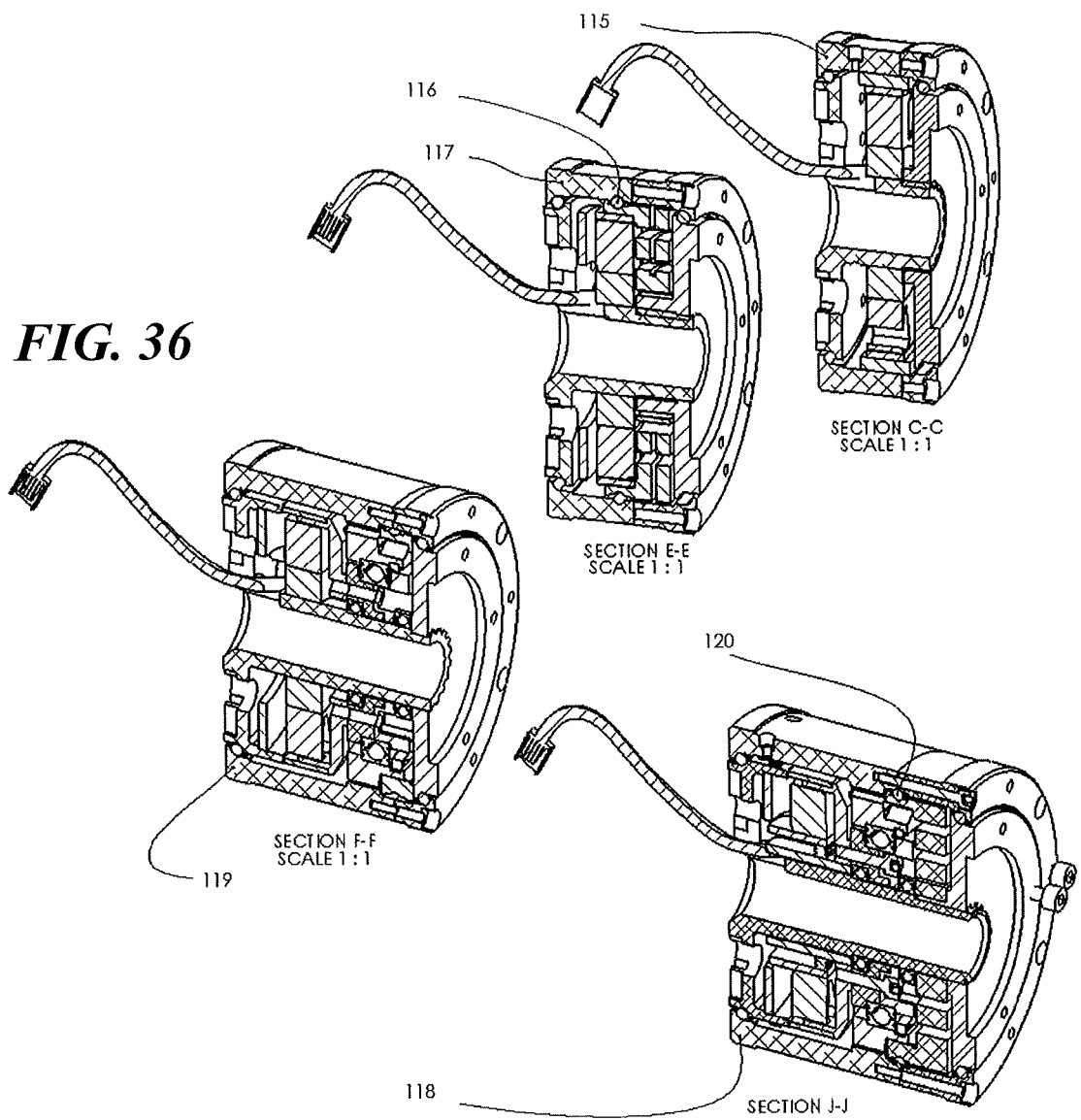
FIG. 36 shows section views of further embodiments of the actuator illustrated in FIG. 3 through the same section profile.

Other embodiments of this invention as shown in FIG. 36 are realized by removing drive train features whilst maintaining the design of the hollow spool shaped stator, the outer housing 10, the mounting hubs 12 and 41 at each end and the arrangement of bearings 37 and 34 that support rotation of the outer housing around the inner stator spool.

FIG. 36 shows the fully featured drive train including the motor, speed reducer and spring element. FIG. 36c shows an embodiment without the spring element hence this operates as a stiff servo. FIG. 36b shows an embodiment further excluding the speed reducer and re-introducing the spring element which operates as a direct drive actuator without a speed reducer that can do force sensing and has impact resilience due to the inclusion of the spring element. FIG. 36a shows an embodiment including only the motor drive train element which operates as direct drive motor. A further embodiment not shown here includes no drive train elements and thus operates as a freewheeling joint with inner spool like stator, an outer housing supported on bearings and including the mounting hubs at each end.

FIG. 36 shows some possible actuator embodiment variations: Top view a) is a section view of actuator configured as a direct drive electric motor with hollow centre, inner and outer mounting hubs, an outer housing, cone bearings, a stator with looming and a motor rotor fixedly attached to the outer housing. View b) is a sectional view of the actuator of a) further incorporating a series elastic spring element connecting the rotor to the outer housing 10 and outer mounting hubs. A bearing rotatably connects the motor rotor to the outer housing to ensure true rotational alignment during operation and whilst under load. View C) shows a sectional view of the actuator of b) further incorporating a speed reducer. View d) is a sectional view of the actuator shown in view c) further incorporating a spring element which elastically connects the speed reducer stator ring gear to the stator core 41;

Further embodiments beyond these are configured by including or excluding the controller with the embodiments listed above. Hence position sensing can be added to the freewheeling embodiment, a controller can be added to the direct drive embodiment etc.

Vernier

A further aspect of embodiments of this invention can be seen in FIG. 1 and is the inclusion of a vernier inner and outer circular scales marked on the outer mounting and inner mounting hubs of the actuator to add the facility of visually reading the precise angular displacement of the actuator independently of the electronic position sensing systems. This enables manual calibration and joint displacement measurements to be made without having to rely on the devices instrumentation. It can also aid in the calibration of the devices electronic position sensing systems.

INDUSTRIAL APPLICABILITY

Embodiments of the present invention provide a robot muscle series elastic actuator incorporating novel and standard speed reducers provides an ideal bearing, actuator and control system solution for robot joints, track and wheel drives, artificial digits and limbs, puppet automation, electric vehicle locomotion and automation devices creating movement, torque, power, positioning and environmental awareness for systems capable of great work.

A versatile robot muscle series elastic actuator extends the capabilities of existing robot joint actuators through its novel design to include operation as a self-contained geared wheel hub motor solution for robot track and wheel drives and also for electric vehicles in general.

The cylindrically modular device with hollow centre, high rigidity bearings and highly versatile symmetric mounting hubs provides a simple, economical, homogeneous and versatile automation solution.

Novel speed reducers are presented that provide simple, economical, high torque density, low backlash and balanced transmissions ideal as standalone transmission solutions as well as being ideal for incorporating into the robot muscle series elastic actuator presented here.

The modular device is optionally hollow, with high rigidity bearings and highly versatile, double ended mounting hubs provides a simple, light weight, economical, homogeneous and versatile automation solution.

A double ended actuator is presented which can function as a wheel axle and bearing assembly or as an actuated joint that is modular, scalable and configurable and that can incorporate freewheeling variations and direct drive variations. These actuator embodiments can include novel or standard speed reducer options which provides an ideal bearing, actuator and control system solution for robot joints, track and wheel drives, artificial digits and limbs, puppet automation, heavy equipment, electric vehicle locomotion and automation devices creating movement, torque, power, positioning and environmental awareness for systems capable of great work.

In one form access to both stator and output mounting hubs is available at both ends of the device via optimally placed mounting hubs and integrated hub bearings resulting in a high rigidity self-contained joint or rotatable hub with low weight construction that allows infinitely rotatable output across the entire outer housing. Furthermore the improvement provides for novel freewheeling, direct drive, geared or even series elastic operation of the actuators presented here.

The above describes only some embodiments of the present invention and modifications, obvious to those skilled in the art, can be made thereto without departing from the scope of the present invention.

Part Numbering List

TABLE 1

| ITEM NO. | DESCRIPTION |
|---|---|
| 10 | Outside housing; outer housing |
| 11 | Controller circuit board; controller circuit board |
| 12 | Outer hub downstream (outer mounting hub); outer hub downstream; outer hub; outer mounting hub; Outer hub |
| 13 | Cable loom; cable loom |
| 14 | DC motor assembly |
| 15 | DC motor hollow shaft axle |
| 16 | DC motor, motor mount |
| 17 | DC motor stator base |
| 18 | DC motor ball bearing race |
| 19 | DC motor ball bearing race |
| 20 | DC motor front hub and dish |
| 21 | DC motor rotor bell periphery magnet cover; Motor rotor |
| 22 | DC motor stator windings; Motor stator windings |
| 23 | Precession drive assembly (Assem1); Speed Reducer drive assembly; Precession drive assembly |
| 24 | Ring gear (Secondary or output ring gear) (upstream) Output ring gear; output gear; Output ring gear pitch circle |
| 25 | Ring gear (Primary or stator ring gear) (downstream); Stator ring gear; stator ring gear (primary); Stator Ring gear pitch circle |
| 26 | Offset crank; offset crank; Offset crank counter balance; Rotor with offset crank; counter balance; Offset crank axis; Central rotor axis |
| 26A | Offset crank axis |
| 27 | Bearing retainer (crank half downstream); Bearing retainer |
| 28 | Compound pinion; compound pinion; primary gears; secondary gears; Compound pinion primary set of teeth pitch circle |
| 28A | Compound pinion secondary set of teeth pitch circle |
| 29 | Pinion bearing (Ball bearing race (44 × 35 × 5)); Pinion bearing |
| 30 | Ball bearing race (27 × 20 × 4) (motor and crank bearing upstream); Ball bearing race |
| 31 | Ball bearing race (27 × 20 × 4)(motor and crank bearing downstream); Bearing; Ball bearing race; Ball bearing |
| 32 | Pinion bearing circlip retainer; Circlip |
| 33 | Series elastic actuator spring element; Series elastic spring element; S.E.A spring; spring element; Spring element |
| 34 | Cone bearing balls and retainer assembly (Downstream); Outer hub bearing; Cone bearings and retainer assembly; Hub bearing |
| 35 | Cone bearing ball retainer downstream |
| 36 | Cone bearing balls downstream |
| 37 | Cone bearing balls and retainer assembly (upstream); Inner mounting hub bearing; Hub bearing |
| 38 | Cone bearing ball retainer upstream |
| 39 | Cone bearing balls upstream |
| 40 | Stator Assembly |

TABLE 1-continued

| ITEM NO. | DESCRIPTION |
|---|---|
| 41 | Hollow stator core; inner mounting hub 41A; Upstream inner mounting hub; hollow stator core; Hollow stator, upstream inner hub; stator core |
| 41A | Hollow stator core |
| 42 | Hub nut (Inner hub retaining nut); hub nut |
| 43 | Cone bearing inner hub (Stator hub downstream); Downstream inner mounting hub; cone bearing inner hub with Vernier scale; cone bearing inner hub; Inner hub; Linner mounting hub; Inner mounting hub |
| 44 | Absolute potentiometer assembly; Absolute P.O.T. assembly |
| 45 | Absolute potentiometer slip ring |
| 46 | Absolute Potentiometer brushes |
| 47 | Potentiometer tracks absolute potentiometer assembly |
| 48 | Outer hub upstream; outer mounting hub |
| 49 | Bolt |
| 50 | Bolt |
| 51 | Precession drive assembly (external crank configuration) |
| 52 | Rotor with offset crank (external crank configuration); Rotor with offset crank (external crank config); Offset crank (external crank config); Counter balance void |
| 53 | Compound pinion (external crank configuration); Compound pinion; Compound pinion (external crank config) |
| 54 | Ring gear primary (external crank configuration); Stator ring gear; Stator ring gear (external crank config) |
| 55 | Output ring gear (Ring gear secondary)(external crank configuration); Output ring gear |
| 56 | Precession drive assembly (Hybrid configuration) |
| 57 | Offset crank (Hybrid configuration); Offset crank (Hybrid configuration); Rotor with offset crank (hybrid config); Crank counterbalance |
| 58 | Compound pinion (Hybrid configuration); Compound pinion |
| 59 | Outer ring gear(Hybrid configuration) Output ring gear; Output ring gear; Output ring gear (hybrid config) |
| 60 | Inner ring gear (Hybrid configuration) stator ring gear; Stator ring gear |
| 61 | Pinion bearing; Pinion bearing |
| 62 | Direct coupling; Direct coupling |
| 63 | Classic radio control servo system assembly |
| 64 | Robot muscle actuator assembly; Robot muscle actuator assembly |
| 64A | Robot muscle actuator assembly # 1; Robot Muscle # 1 |
| 64B | Robot muscle actuator assembly # 2; Robot Muscle # 2 |
| 64C | Robot muscle actuator assembly # 3; Robot Muscle # 3 |
| 65 | Servo control horn; Servo control horn |
| 66 | Clevis rod end; Clevis rod end |
| 67 | Push rod; Push rod |
| 68 | Slave control horn; Slave control horn |
| 69 | Dual tendon capstan drive assembly |
| 70 | Capstan rim hub; Capstan rim hub |
| 71 | Tendon; Tendon |
| 73 (68) | Slave control horn |
| 73 (66) | Clevis rod end |
| 74 | Tendon end crimp; Tendon end crimp |
| 75 | Fully collapsible joint assembly |
| 76 | Limb tube; Limb tube |
| 77 | Spherical elbow joiner |
| 78 | Triple degree of freedom actuator joint assembly |
| 79 | Outer flange hub elbow; Outer flange hub elbow |
| 80 | Inner flange hub elbow; Inner flange hub elbow |
| 81 | Inner flange hub adapter; Inner flange hub adapter |
| 82 | Outer flange hub adapter; Outer flange hub adapter |
| 83 | Electric Vehicle wheel hub drive assembly |
| 84 | Wheel rim; Wheel rim |
| 85 | Spoke; Spoke |
| 86 | Spoke flange adapter; Spoke flange adapter |
| 87 | Track hub drive actuator configuration |
| 88 | Track; Track |
| 89 | Secondary (passive) actuator, bearing only assembly; Secondary (passive) actuator, bearing only assembly |
| 90 | |
| 91 | Cycloidal reducer assembly |
| 92 | Ring gear (Secondary or output ring gear) (upstream) |
| 93 | Ring gear (Primary or stator ring gear) (downstream) |

TABLE 1-continued

| ITEM NO. | DESCRIPTION |
|---|---|
| 94 | Offset crank; Offset crank |
| 95 | Bearing retainer (crank half downstream); Bearing retainer and counterbalance |
| 96 | Compound pinion; Compound pinion |
| 97 | Pinion bearing (Ball bearing race (44 × 35 × 5)); Pinion bearing |
| 98 | Bearing race (motor and crank bearing upstream) |
| 99 | Bearing race (motor and crank bearing downstream) |
| 100 | Pinion bearing circlip retainer |
| 101 | Stator ring gear bearing (Supports SEA configuration); Stator ring gear bearing |
| 102 | Intentionally left blank |
| 103 | Inline reducer assembly |
| 104 | Output ring gear (Secondary mesh); Output ring gear |
| 105 | Stator ring gear (Primary mesh; Stator ring gear) |
| 106 | Rotor with offset crank; Rotor; Rotor Offset crank; Rotor with offset crank |
| 107 | Bearing retainer (crank half downstream) |
| 108 | Compound pinion; Compound pinion; Compound pinion (inline) |
| 109 | Pinion bearing (Ball bearing race |
| 110 | Bearing race (motor and crank bearing upstream) |
| 111 | Bearing race (motor and crank bearing downstream) |
| 112 | Pinion bearing circlip retainer |
| 113 | Upstream end of housing assembly; upstream side |
| 114 | Downstream end of housing assembly; downstream side |
| 115 | Direct drive motor |
| 116 | Motor rotor bearing |
| 117 | Direct drive motor with S.E.A & controller |
| 118 | Motor drive, speed reducer SEA & controller |
| 119 | Motor drive, speed reducer, rigid actuator & controller |
| 120 | Motor rotor bearing |
| 121 | Standard internal pinion |
| 122 | Offset crank centre |
| 123 | Motor centre |
| 124 | External pinion |
| 125 | Hybrid pinion |
| 126 | Inline pinion |
| 127 | Bearing |
| 128 | Bearing |
| 129 | Crank offset |

TABLE 2 shows a selection of teeth combinations, stator and output mesh ratios and final reducer output ratios with direction. Note detail has been lost for some numbers as they have been truncated to 2, 3 or 4 decimal places in this table.

| Stator gear teeth | 12 | 20 | 25 | 100 | 199 | 79 | 100 |
|---|---|---|---|---|---|---|---|
| Pinion primary teeth | 11 | 19 | 24 | 84 | 183 | 78 | 99 |
| Stator ratio | 0.0909 | 0.0526 | 0.0417 | 0.1905 | 0.0874 | 0.0128 | 0.0101 |

| Pinion secondary teeth | Output gear teeth | output ratio | Resultant speed reducer ratios | | | | |
|---|---|---|---|---|---|---|---|
| 12 | 13 | 0.0833 | −143.0 | 35.3 | 26.0-10.1 | −264.3 | 15.4 | 14.8 |
| 20 | 21 | 0.0500 | −25.7 | −399.0 | 126.0 −7.5 | −28.1 | 28.2 | 26.3 |
| 20 | 26 | 0.3000 | 6.2 | 5.3 | 5.0 11.9 | 6.1 | 4.5 | 4.5 |
| 25 | 26 | 0.0400 | −20.4 | −82.3 | −624.0 −6.9 | −21.9 | 38.3 | 34.8 |
| 82 | 98 | 0.1951 | 11.5 | 8.4 | 7.8257.2 | 11.1 | 6.6 | 6.5 |
| 27 | 28 | 0.0370 | −19.3 | −66.5 | −224.0 −6.8 | −20.6 | 42.8 | 38.5 |
| 184 | 200 | 0.0870 | −275.0 | 31.7 | 24.0-10.5 | −2287.5 | 14.7 | 14.1 |
| 79 | 80 | 0.0127 | −12.9 | −25.3 | −34.9 −5.7 | −13.5 | −6240.0 | 396.0 |
| 98 | 99 | 0.0102 | −12.5 | −23.8 | −32.1 −5.6 | −13.1 | −386.1 | 9801.0 |

What is claimed is:

1. An internally balanced involute-type speed reducer; the reducer comprising a stator stage, an input stage, an output stage, and a plurality of gear sets in mesh, the reducer further comprising:

a stator ring gear including a row of many gear teeth fixedly connected to a stator core by a direct coupling, and a rotor providing input torque rotatably connected to the stator core about a central axis and inclusive of an offset crank with offset axis parallel to the central axis and offset by a distance of the crank offset, and an offset crank fixedly connected to the rotor, the crank rotatably connected to a compound pinion; the crank offset sized to position the compound pinion teeth in mesh on one side with the ring gears; the rotor rotating with gears in mesh between the stator ring gear and pinion teeth; whereby the compound pinion precesses round the stator ring gear;

a counterweight fixedly connected to the rotor and located in a void between an external gears and the ring gears and 180 degrees out of phase with the offset crank of the rotor, and the compound pinion including two rows of many gear teeth laid out in rows that mesh with ring gear and output gear where their pitch circles intersect at only one point per mesh; the compound pinion being rotatably connected to the rotor about the offset) crank axis, and an output ring gear coaxial to the stator and comprising:

a plurality of gear teeth distributed evenly about the central axis and in constant mesh with the gears of the compound pinion; whereby precession of the compound pinion around the stator ring gear induces rotation of the output ring gear about the central axis; the reducer gear ratio set by difference between the reduction ratio of the compound pinion and stator ring gear and the reduction ratio of the pinion gears and output ring gear; the output rotation direction set depending on whether the ratio of stator ring gear teeth to pinion teeth is greater or less than that between the output ring gear teeth and the compound pinion teeth, wherein an actuator assembly further includes a hollow center extending through the stator core from end to end; and wherein the two rows of gear teeth of the compound pinion are merged into a single set of many gear teeth laid out in a single row, with teeth extending radially outwards and evenly distributed around the peripheral circumference of the compound pinion and in mesh with both the stator ring gear and the output ring gear.

2. The actuator assembly including the speed reducer of claim 1, further including, an electric motor with motor stator windings fixedly connected to the stator core and motor rotor fixedly connected to the rotor, and a plurality of permanent magnets fixedly connected to the motor rotor and evenly spaced around the periphery of the stator.

3. The actuator assembly of claim 2, further including an outer housing and inner and outer mounting hubs constituting, an outer hollow housing having outer hub rings fixedly connected at each end, and inner mounting hubs fixedly connected to each end of the stator core and rotatably connected with the outer mounting hubs.

4. The actuator assembly of claim 1, wherein a spring element replaces the direct coupling, the spring element elastically connects the stator ring gear the stator core.

5. The actuator assembly of claim 4, wherein the stator ring gear is rotatably connected to the outer housing by a bearing about the central axis to ensure gears of the compound pinion and stator ring gear mesh without misalignment despite the stator ring gear being elastically connected to the stator core.

6. The speed reducer of claim 1, wherein, the two rows of gear teeth of the compound pinion comprise a primary row and an output row that extend from the outer pinion surface and project outwards; and the stator ring gear meshes with the pinion primary row of teeth; the stator ring gear teeth extending from the inner surface of the stator ring gear and projecting inwards, and an output ring gear meshing with the teeth of the output row of the compound pinion; the teeth of the ring gear extending from the inner surface of the stator ring gear and projecting inwards.

7. The speed reducer of claim 6, wherein compound pinion primary and output stages are helical gears of opposing hands with helical gear teeth in mesh with pinion teeth of the correct hand to mesh.

8. The speed reducer of claim 6, wherein the stator ring gear teeth and compound pinion teeth have a cycloid profile and an internal counterbalance is fixedly connected to the rotor and is located within the inner circumference of the compound pinion.

9. The actuator assembly of claim 1, wherein an electronic controller, sensors and cable looms are included.

10. The actuator assembly of claim 9, wherein the sensors include a position sensing transducer signalling relative and absolute angular displacement of the outer housing relative to the stator core.

11. The actuator assembly of claim 10, wherein the actuator assembly is a robot actuator assembly.

12. The actuator assembly of claim 9, wherein the controller is situated in the void between the motor and the inner and outer mounting hubs at the upstream end of the device and is fixedly connected to the stator core.

13. The actuator assembly of claim 1, wherein the inner and outer mounting hubs have a plurality of tapped holes positioned at regular intervals around their axis.

14. The actuator assembly of claim 13, wherein hole geometry is the same for corresponding inner and outer mounting hubs at each end of the device.

15. The actuator assembly of claim 13, further including a plurality of tapped mounting holes on the outer housing.

16. The actuator assembly of claim 13, wherein the bearings that rotatably connect the inner and outer hubs are cone bearings.

17. The actuator assembly of claim 13, wherein the bearings that rotatably connect the inner and outer hubs are deep groove ball bearings.

* * * * *